US012430656B2

(12) United States Patent
Aurongzeb et al.

(10) Patent No.: US 12,430,656 B2
(45) Date of Patent: Sep. 30, 2025

(54) CARBON FOOTPRINT OPTIMIZED SYSTEM AND METHOD FOR RECOMMENDING A PRIORITY FOR REPLACEMENT OR WORKLOAD REDISTRIBUTION FOR HARDWARE ACROSS AN ENTERPRISE SYSTEM

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 392 days.

(21) Appl. No.: 17/875,668

(22) Filed: Jul. 28, 2022

(65) Prior Publication Data

US 2024/0037566 A1 Feb. 1, 2024

(51) Int. Cl.
*G06Q 30/018* (2023.01)
*G06Q 10/20* (2023.01)

(52) U.S. Cl.
CPC .......... *G06Q 30/018* (2013.01); *G06Q 10/20* (2013.01)

(58) Field of Classification Search
CPC ............................. G06Q 30/018; G06Q 10/20
(Continued)

(56) References Cited

U.S. PATENT DOCUMENTS 8,626,450 B2 1/2014 Dooley
10,318,903 B2 6/2019 Johnson
(Continued)

FOREIGN PATENT DOCUMENTS

WO 2011/106160 A2 9/2011

OTHER PUBLICATIONS

U. Gupta et al., "Chasing Carbon: The Elusive Environmental Footprint of Computing," 2021 IEEE International Symposium on High-Performance Computer Architecture (HPCA), Seoul, Korea (South), 2021, pp. 854-867, doi: 10.1109/HPCA51647.2021.00076 (Year: 2021).*

(Continued)

*Primary Examiner* — Wenren Chen
(74) *Attorney, Agent, or Firm* — Prol Intellectual Property Law, PLLC; H. Kenneth Prol

(57) ABSTRACT

A hardware right to repair prioritization system comprising a graphical user interface (GUI) to receive partial rankings of requirements for prioritizing an failing component replacement, where each requirement describes a characteristic having varied values across the failing components, a processor to generate a priority requirement ranking for all of the requirements, based on the partial rankings, determine a replacement priority rank for each failing component, based on characteristic values for each failing component and priority requirement ranking; determine a change in carbon dioxide ($CO_2$) footprint resulting from replacement of each of the failing components, generate a $CO_2$ optimized replacement priority rank by weighting the replacement priority rank by the change in $CO_2$ footprint for each of the failing components; identify a failing component associated with a highest $CO_2$ optimized replacement priority rank as a top replacement candidate, and the GUI to recommend immediate replacement of the top replacement candidate.

13 Claims, 6 Drawing Sheets

(58) Field of Classification Search
USPC .......................................................... 705/305
See application file for complete search history.

(56) References Cited

U.S. PATENT DOCUMENTS

| | | | |
|---|---|---|---|
| 10,417,614 B2 | 9/2019 | Johnson | |
| 10,581,974 B2 | 3/2020 | Sustaeta | |
| 2009/0292617 A1 | 11/2009 | Sperling | |
| 2010/0070404 A1 | 3/2010 | McConnell | |
| 2014/0100937 A1 | 4/2014 | Na | |
| 2014/0316964 A1 | 10/2014 | Slutsker | |
| 2016/0370843 A1* | 12/2016 | Gatson | G06F 1/3206 |
| 2017/0257303 A1* | 9/2017 | Boyapalle | H04L 67/1001 |
| 2020/0053175 A1* | 2/2020 | Bodman | H04L 67/01 |
| 2020/0151079 A1* | 5/2020 | Tiwari | G06N 3/042 |
| 2021/0081020 A1 | 3/2021 | Ghose | |

OTHER PUBLICATIONS

A. Perini et al., "A Machine Learning Approach to Software Requirements Prioritization," IEEE Transactions of Software Engineering, vol. 39. No. 4, Apr. 2013, pp. 445-461.

C. Herrmann, et al., "Sustainability as Strategic Business Model for Profitable Business," 6 pages, May 2014.

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-Jul. 14, 2021/.

\* cited by examiner

CARBON FOOTPRINT OPTIMIZED SYSTEM AND METHOD FOR RECOMMENDING A PRIORITY FOR REPLACEMENT OR WORKLOAD REDISTRIBUTION FOR HARDWARE ACROSS AN ENTERPRISE SYSTEM

FIELD OF THE DISCLOSURE

The present disclosure generally relates to determining solutions for failure of hardware components across information handling systems of an enterprise system. More specifically, the present disclosure relates to a machine learning system for generating carbon dioxide ($CO_2$) footprint optimized recommendations for prioritizing replacement or workload redistribution of such failing hardware components, based in part on user-specified considerations.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
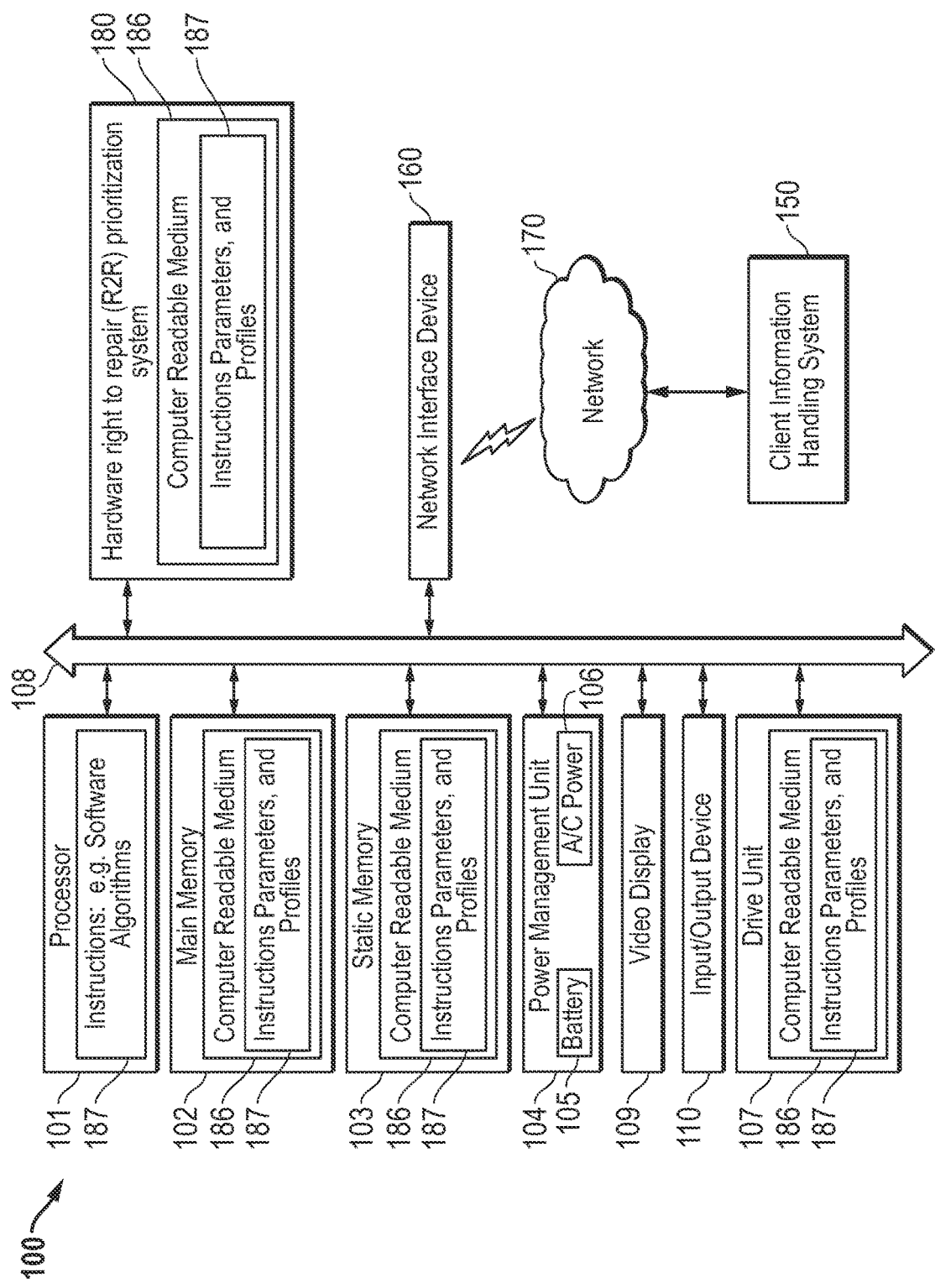
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. Further, enterprise systems managing large numbers of hardware devices such as information handling systems and hardware supporting such operations, including building infrastructure and network infrastructure may also seek to minimize such GHG emissions across their enterprise systems. One way in which enterprise systems may minimize such GHG emissions is by optimizing their approaches to the replacement of broken or failing hardware components based on consideration of GHG emissions produced by each available approach.

Several hardware components within an enterprise system may fail, break, or underperform at any given time. For example, many hardware components will simply age out at roughly the same point. Existing systems use input provided by high-level decision makers within the enterprise system, such as purchasing directors, Chief Operating Officers (COO), or information technology (IT) managers working within budget and downtime restrictions to decide the priority in which each of these hardware components may be replaced.

The present disclosure includes a system using machine-learning algorithms to model the process to prioritize replacement or workload redistribution for these many broken hardware components. For example, in scenarios where the high-level user must consider a large number of factors in order to make such determinations, a machine-learning priority ranking method is useful in modeling a user's decision making process. Further, in view of the increasing value of GHG emissions reduction, the presently disclosed system incorporates consideration of the ways in which these decisions may impact the carbon footprint for the enterprise among plural client information handling systems and other hardware components managed by the enterprise.

The hardware R2R prioritization system in embodiments of the present disclosure addresses the above issues by weighting a user-centric ranking for each of several currently failing hardware components determined using a machine-learning priority ranking method by estimated or determined carbon footprints resulting from each available solution (e.g., replacement or workload redistribution). By weighting the user-centric rankings in such a manner, the hardware R2R prioritization system may make CO2 optimized recommendations for the order in which various hardware components across an enterprise system may be replaced or have their workloads redistributed across available backups in order to minimize the CO2 footprint for the enterprise system.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 186 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101 executing instructions of a hardware right to repair (R2R) prioritization system 180, the wireless network interface device 160, a static memory 103 or drive unit 107, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 187, such as for the hardware R2R prioritization system 180 that may operate on servers or systems as management information handling systems, at remote data centers, or on-box in individual, managed client information handling systems 100 according to various embodiments herein. In some embodiments, it is understood any or all portions of code instructions 187 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 186 storing instructions 187. In some embodiments, information handling system 100, or portions thereof, may represent a client information handling system operating various hardware components (e.g., processor 101, memory 102, network interface device 160, power management unit 104) in need of occasional replacement, and executing an agent of the hardware R2R prioritization system 180, as described in greater detail below with respect to FIG. 2. In other embodiments the information handling system 100 may represent one or more management server information handling systems, such as a unified endpoint management platform (UEM according to embodiments herein, executing the hardware R2R prioritization system 180. Further, an information handling system 100 in any role of embodiments herein may execute operating system (OS) software, application software, BIOS software, or other software applications or drivers detectable by processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, so that a device connected to a network 170 may communicate voice, video or data over the network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as making CO2 optimized recommendations for the order in which various hardware components across an enterprise system may be replaced or have their workloads redistributed across available backups in order to minimize the CO2 footprint for the enterprise system. For example, instructions 187 may include a particular example of a hardware R2R prioritization system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The hardware R2R prioritization system 180 may utilize a computer-readable medium 186 in which one or more sets of instructions 187 may operate in part as software or firmware instructions executed on the information handling system 100. The instructions 187 may embody one or more of the methods or logic as described herein. For example, instructions relating to the hardware R2R prioritization system 180, firmware or software algorithms, processes, and/or methods may be stored here. Such instructions 187 may comprise weighting a user-centric ranking for each of several currently failing hardware components determined using a machine-learning priority ranking method by estimated or determined carbon footprints resulting from each available solution (e.g., replacement or workload redistribution), for example. The hardware R2R prioritization system 180 may operate within a Unified Endpoint Management (UEM) platform that gathers telemetries from a plurality of client information handling system 150 endpoints via the network 170 that describe operating environments for those client information handling systems (e.g., 150). The UEM platform in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a sever executing a UEM platform. In other embodiments, the information handling system 100 may depict a managed client information handling system (e.g., 150) that reports to a UEM and receives recommendations from the UEM pursuant to various embodiments described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the hardware R2R prioritization system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
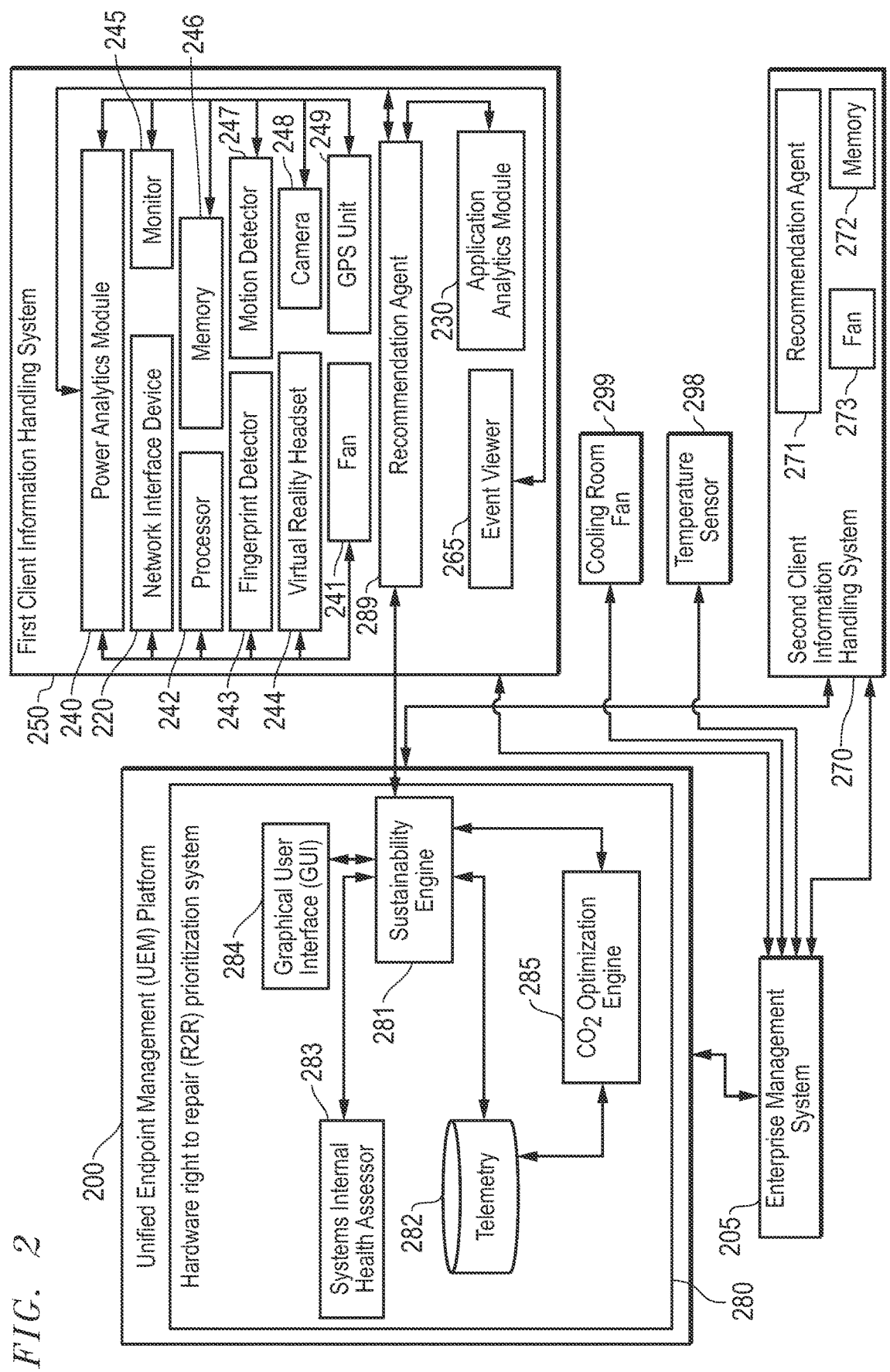
FIG. 2 is a block diagram illustrating a hardware right to repair (R2R) prioritization system according to an embodiment of the present disclosure.

FIG. 2 is a block diagram illustrating a hardware right to repair (R2R) prioritization system of a unified endpoint management (UEM) platform communicating carbon dioxide ($CO_2$) optimized recommendations for replacement or workload redistribution for a plurality of failing hardware components across an enterprise system according to an embodiment of the present disclosure. A UEM platform 200 in an embodiment may execute a hardware R2R prioritization system 280 in communication with an enterprise management system 205, which may act as an interface between a plurality of managed client information handling systems (e.g., 250 or 270) and the UEM 200. The UEM platform 200 and enterprise management system 205 in an embodiment may operate as a cloud-based service in communication with the enterprise management system 205 via a network to identify information technology (IT) issues at a first client information handling system 250 or a second client information handling system 270. The UEM platform 200 may also provide support for such issues, including automatically updating drivers or hardware components, as needed. In a specific embodiment of the present disclosure, the UEM platform 200 may gather telemetries from a plurality of client information handling system (e.g., 250 and 270) that describe operating environments for those client information handling systems (e.g., power usage by a plurality of hardware components, hardware component consumption levels, or analytics for software usage).

A hardware R2R prioritization system 280 operating at the UEM platform 200 in an embodiment may determine an amount of greenhouse gas (GHG) emissions that may be attributable to usage at an information handling system of software applications and power, and recommend solutions to a plurality of hardware components across several of client information handling systems (e.g., 250 and 270) to minimize such emissions. These recommendations may be made based upon telemetry data gathered from a pool of information handling systems, including 250 and 270 and others in various embodiments, and across various other hardware components operating independently of the client information handling systems, such as a cooling room fan 299 and a temperature sensor 298 for the cooling room. The UEM platform 200 may receive such telemetries from a plurality of client information handling systems (e.g., 250 and 270), and from other hardware components (e.g., 298, 299), which may be managed by the same enterprise management system (e.g., 205), or may be managed by separate enterprise management systems in various embodiments.

Each client information handling system (e.g., 250 or 270) in an embodiment may include a plurality of hardware components. For example, a first client information handling system 250 in an embodiment may include a network interface device 220, a processor 242 (e.g., central processing unit (CPU), graphics processing unit (GPU), or visual processing unit (VPU)), a display 245, a fan 241, and a memory 246. In some embodiments, the first client information handling system 250 may further include one or more sensing devices, such as a motion detector 247, a camera 248, a fingerprint detector 243, or location sensing devices 249 (e.g., GPS location unit), peripheral devices such a virtual reality headset 244.

A power analytics module 240 in an embodiment may be in communication with various hardware components (e.g., 220, 241, 242, 243, 245, 246, 247, 248, or 249) and firmware for those components in an embodiment. For example, the power analytics module 240 may monitor power consumption by each of the various hardware components (e.g., 220, 241, 242, 243, 245, 246, 247, 248, or 249) in an embodiment. In another example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution).

In another example, the power analytics module 240 in an embodiment may determine current usage of network interface device resources by software applications as a percentage of total capacity for the network interface device 220 to transceive data (e.g., percentage of total available throughput used). In still another example embodiment, the power analytics module 240 may determine policies controlling the periods in which sensing hardware may be operational. More specifically, the power analytics module 240 in an embodiment may determine whether the motion detector 247, or location sensing device (e.g., GPS unit) 249 are set to remain on at all times, to operate only when a laptop or mobile information handling system is in a certain position (e.g., closed or open), to operate when a mobile device is currently moving, or to operate only when a user is actively executing software applications or certain software applications. All information accessed in such a way by the power analytics module 240 in an embodiment may be communicated to the recommendation agent 289.

The power analytics module 240 may be in communication with a recommendation agent 289, which may also be in communication with an application analytics module 230. In an embodiment, the application analytics module 230 may monitor and adjust execution of software applications within the operating system (OS) for the first client information handling system 250. The application analytics module 230 in another example may determine current usage of processing resources as a percentage of total capacity for processor 242 due to each of a plurality of executing software applications. In yet another example, the application analytics module 230 may determine current usage of memory resources as a percentage of total capacity for memory 246 due to each of a plurality of executing software applications. In still another example, the application analytics module 230 may determine current usage of network interface device resources as a percentage of total throughput for the network interface device 220 due to each of a plurality of executing software applications. As still another example, the application analytics module 230 may determine current usage of display resources as a percentage of active display time used in displaying a GUI for each of a plurality of executing software applications. Information gathered by the application analytics module 230 in such an embodiment may be communicated to the recommendation agent 289.

The recommendation agent 289 in an embodiment may also be in communication with an event viewer 265 for the first client information handling system 250. The event viewer 265 (e.g., Microsoft® Event Viewer) in an embodiment may track computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 241, 242, 243, 244, 245a, 245b, 246, 247, 248, or 249) producing the error. The recommendation agent 289 in an embodiment may routinely collect information from each of the power analytics module 240, the application analytics module 230 or the event viewer 265 at preset intervals, or may do so upon notification by one of these modules (e.g., 230, 240, or 265) of a specific event, failure, or warning, such as a temperature measurement exceeding a preset maximum temperature threshold value. Upon each data collection cycle in an embodiment, the recommendation agent 289 may transmit the collected power analytics, application analytics, or event viewer logs to the sustainability engine 281 at the hardware R2R prioritization system 280.

The hardware R2R prioritization system 280 at the UEM platform 200 in an embodiment may include a sustainability engine 281, telemetry storage 282, a systems internal health assessor (SIHA) 283, and a CO2 optimization engine 285. The sustainability engine 281 in an embodiment may operate to routinely gather telemetries from client information handling systems (e.g., 250 and 271). Each analytics or event log thus received in an embodiment may be stored in telemetry 282 for later analysis by the Systems Internal Health Assessor (SIHA) 283 or the hardware R2R prioritization system 280. Such telemetry 282 may also include information such as an equivalent CO2 emissions value determined at one or more client information handling systems (e.g., 250) resulting from usage of software applications, or known statistics for GHG emissions due to power consumption in the measured location of a client information handling system (e.g., 250). In another aspect, the telemetry 282 may also include results of benchmark testing performed at the power analytics modules (e.g., 240) of each of a plurality of information handling systems (e.g., 250 and 270) transmitting analytics and event logs to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 246), based on the speed and accuracy with which each component completes these basic tasks.

The systems internal health assessor (SIHA) 283 in an embodiment may search telemetry 282 data to identify indications within received application analytics, power analytics, or event viewer logs of hardware failures, errors, or underperformance at reporting client information handling systems (e.g., 250 or 270). For example, the SIHA 283 in an embodiment may search such analytics or logs stored in telemetry 282 to identify an error at the memory 246 of the first information handling system 250 and an error at the cooling room fan 299. Components such as cooling room fan 299 or temperature sensor 298 may be internet of things devices that are network connected and report status, including power and operating condition status in some example embodiments. As described above, any of a number of WHEA or other conventionally recorded errors may appear within event viewer 265 logs and may identify any of the hardware components (e.g., 220, 241, 242, 243, 244, 245, 246, 247, 248, or 249) operating at the client information handling systems 250 and 270 in an embodiment. In another embodiment, the enterprise management system 205 may routinely check sensors, such as temperature sensor 298 or power consumption of the cooling room fan 299 to determine when the cooling room fan 299 is drawing excessive power, drawing no power (e.g., inoperable), or failing to maintain a maximum temperature threshold, as determined by the temperature sensor 298. Upon identification of such an error associated with an identified hardware component, the SIHA 283 may transmit a notification to the sustainability engine 281 identifying the failing hardware component (e.g., memory 246 or cooling room fan 299).

In other embodiments, the SIHA 283 may determine that a component is failing if one or more event logs for the information handling system (e.g., 250) using that hardware component (e.g., 246) include a number of errors for that component (e.g., 246) that meets or exceeds a maximum error threshold (e.g., 100, 50, 10, 5) within a preset period of time (e.g., 24 hours). These are only example maximum error threshold values and preset time period values, and any values for these thresholds are contemplated herein.

As another example, the SIHA 283 may determine that a component is failing if one or more event logs for the information handling system (e.g., 250) indicate a test benchmark score for that component (e.g., 246) that falls below a preset minimum benchmark threshold value (e.g., 85% of average crowd-sourced benchmark value). As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, network interface device, etc.), the SIHA 283 in an embodiment may determine the average test benchmark value across a plurality of information handling systems (e.g., 250 and 270), against which test benchmark values for individual components (e.g., 242, 246, 220) may be compared in order to determine whether such an individual component is underperforming or failing. For example, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a processor is failing may be 90%, for example.

The CO2 optimization engine 285 in an embodiment may store information such as known statistics for GHG emissions due to power consumption in the measured location of a client information handling system (e.g., 250 or 270). Upon receipt of the telemetry identifying the location of the first client information handling system 250 in an embodiment, the sustainability engine 281 may retrieve a distributed power CO2 emissions value for the geographic location of the first client information handling system during the current monitoring period from the CO2 optimization engine 285. In some embodiments in which the first client information handling system 250 is operating on battery power during some or all of a given monitoring period, the sustainability engine 281 may retrieve a distributed power CO2 emissions value for the geographic location in which the first client information handling system charged the battery most recently, which may have occurred partially or wholly outside of the current monitoring period. Such a distributed power CO2 emissions value may describe the amount of GHG emitted during the generation of a single unit of power (e.g., one kWh) by a power plant known to supply power within the geographic region including the location of the first information handling system 250.

As described herein, the distributed power CO2 emissions value in an embodiment may describe the amount of CO2 or other GHGs emitted during generation of each Watt of power at a specific power plant providing power to all devices within an area including the geographic location of a client information handling system (e.g., 250 or 270). The amount of GHG emitted per Watt of power may differ widely across such power plants, based on the method of power production (e.g., solar power vs. coal-burning plant). Thus, the distributed power CO2 emissions value (e.g., in CO2 pounds per Watt) may vary markedly between geographic locations.

The CO2 optimization engine 285 in an embodiment may also store known values for CO2 or other GHGs emitted during the manufacture and transport of the hardware component(s) (e.g., 246 or 299) identified at block 502 as failing. More specifically, the CO2 optimization engine 285 in an embodiment may retrieve the CO2 footprint of 20 pounds associated with manufacture of a memory 246 (e.g., computer hard drive) capable of replacing the memory 246 (e.g., having similar capabilities) from the CO2 optimization engine 285. In another example, the CO2 optimization engine 285 in an embodiment may retrieve the CO2 footprint of 800 pounds associated with manufacture of an industrial fan capable of replacing the cooling room fan 299 (e.g., having similar capabilities) from the CO2 optimization engine 285. The replacement CO2 footprints for various hardware components stored at the CO2 optimization engine 285 in an embodiment may be determined by the manufacturers for such components.

The sustainability engine 281 of the hardware R2R prioritization system 280 in an embodiment may operate to recommend replacement or workload redistribution for a plurality of hardware components of the client information handling systems (e.g., 250 or 270) or components (e.g., 299) operating independently within the same enterprise system that have been identified as failing by the SIHA 283. Such a recommendation may depend upon the criticality of failure for each of these hardware components. For example, recommendations made by the sustainability engine 281 in an embodiment may prioritize the replacement of one hardware component (e.g., 299) over another (e.g., 246). As described below with respect to FIG. 3, these determinations may be made in various embodiments based on CO2 optimized ranking measurements, meaning such determinations take into account both the user's priorities in choosing between and the CO2 footprint resulting from various available solutions to the failure of a plurality of hardware components across an enterprise system. In such a way, the hardware R2R prioritization system 280 in an embodiment may recommend a priority for replacement or workload redistribution for a plurality of hardware components across an enterprise system based on user-specified considerations, such as cost, and an estimated carbon footprint each approach may produce.

Figure 3:
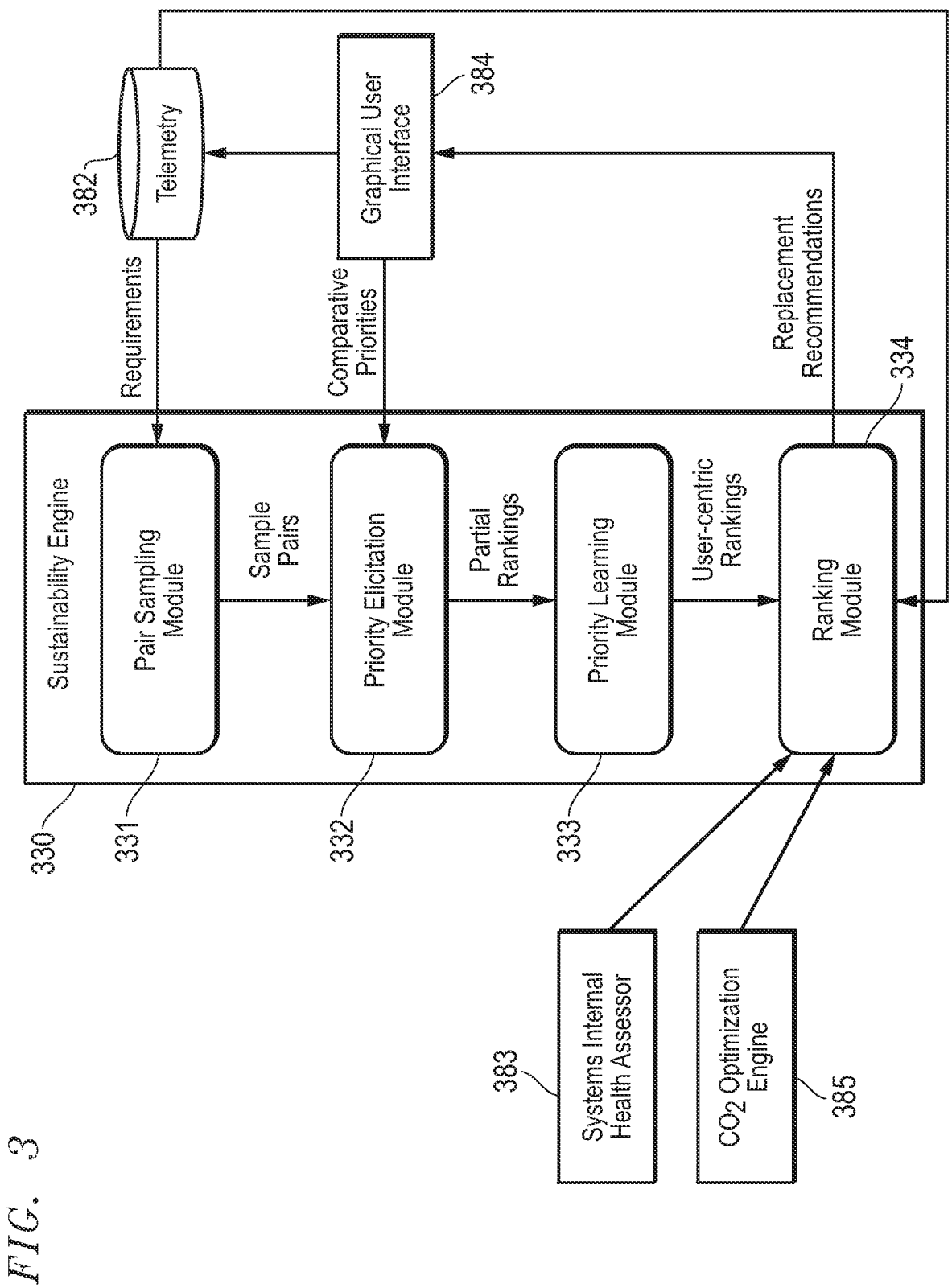
FIG. 3 is a block diagram illustrating a sustainability engine according to an embodiment of the present disclosure.

FIG. 3 is a block diagram illustrating a sustainability engine determining a user-centric priority requirement ranking according to an embodiment of the present disclosure. As described herein, the sustainability engine of the hardware R2R prioritization system in an embodiment may recommend a priority for replacement or workload redistribution for a plurality of hardware components across an enterprise system based on user-specified considerations, such as cost or other requirements, and an estimated carbon footprint each approach may produce.

The user of the sustainability engine 330 may enter the requirements for determining when to replace a hardware component within an enterprise system via the GUI 384. In an embodiment, the user may enter any considerations regularly taken when deciding whether or when to replace a hardware component identified as failing. In other embodiments, the user may select from a list of requirements for determining when to replace a hardware component at the sustainability engine 330. In various scenarios described herein, the appropriate solution to failure of a hardware component may include replacement, redistribution of the workload for that hardware component across available alternatives, or continued use of the failing hardware component at a reduced operating efficiency. In an embodiment, continued use of the failing hardware component at a reduced operating efficiency may also affect other devices reliant on the output or operating efficiency of the failing hardware component, which may be referred to herein as downstream devices. A user may consider several variables for each of these scenarios and compare them against one another to determine the best approach to employ in particular circumstances. For example, a user may consider, for each of those three scenarios (e.g., replacement, redistribution of workload, maintenance of current configuration) the cost, time to implement, change in operating efficiency, or resource consumption of devices relying on functionality of the failing device. In such an example embodiment, a user may enter, via the GUI 384, each of these considerations, for each of the three available approaches.

The GUI 384 may transmit the received, user-specified requirements for storage within the telemetry 382. These requirements may be stored along with actual measured or estimated values for each of these requirements for each of a plurality of failing hardware components within an enterprise system in an example embodiment. For example, telemetry 382 in an embodiment may store telemetry for a failing computer hard drive, including an estimated cost of replacement of the computer hard drive, an estimated time for replacement, an estimated change in operating efficiency of the replacement part, or an estimated resource consumption of the replacement part. In other example embodiments, telemetry 382 may also store telemetry including estimated cost, time to implement, change in operating efficiency, or resource consumption associated with redistribution of the failing computer hard drive's workload across alternative computer hard drives. In still other example embodiments, telemetry 382 may also store telemetry including estimated change in operating efficiency and resource consumption at downstream devices due to failure of the computer hard drive (or relative to operational efficiency by replacement with a new component). The telemetry 382 may store such example telemetries for a plurality of failing hardware components across an enterprise system.

The pair sampling module 331 of the sustainability engine 330 may operate to sample a plurality of pairs of requirements from telemetry and transmit them to the priority elicitation module 332 in an embodiment. As described herein, the sustainability engine 330 in an embodiment may generate a machine-learning model for determining an order in which a plurality of failing components may be replaced or have their workloads redistributed that takes into account user-specified priorities and carbon footprint associated with each potential approach to the failure of those components, as described in greater detail below with respect to FIGS. 4 and 6.

The pair sampling module 331 of the CBRank approach in an embodiment may randomly select pairs of requirements supplied by the user via GUI 384 and stored in telemetry 382. For example, the pair sampling module 331 may randomly select, as a first pair of requirements, cost of replacement and change in operating efficiency of downstream devices caused by the failing component. As another example, the pair sampling module 331 may randomly select, as a second pair of requirements, time to implement a redistribution of workload for the failing component and consumption of resources by a replacement part. These sampled pairs in an embodiment may be transmitted to the priority elicitation module 332 in an embodiment.

The priority elicitation module 332 in an embodiment may prompt the user, via GUI 384, to prioritize consideration requirements of replacement cost or downstream device operating efficiency within the first sampled pair. In other words, prior to a part failing, the user may indicate whether, when a part does eventually fail, she would place more importance on the cost of replacement of the part than on the effect that failure has on downstream devices when deciding whether to replace the part. As another example, the priority elicitation module 332 in an embodiment may prompt the user via GUI 384 to prioritize consideration requirements of downtime to implement a redistribution of workload for the failing component and consumption of resources by a replacement part. Because each pair-wise comparison only ranks two of such requirements with respect to one another, they may be referred to herein as partial rankings.

The priority elicitation module 332 may transmit each of these partial rankings, as selected by the user via GUI 384 to the priority learning module 333. The priority learning module 333 in an embodiment may use each of these pair-wise comparisons in an embodiment to learn how to make decisions that reflect the priorities of the user. In an embodiment, the priority learning module 333 may operate to generate a model of the user's decision making process that ranks the importance of each of the requirements supplied by the user with respect to one another. In other words, such a model may provide a ranking for all of the user-specified requirements routinely used during consideration of replacement, redistribution of workload, or maintenance of current configuration for a failing hardware component. The partial rankings elicited by the priority elicitation module 332 and provided by the user may not provide a full picture of the user's priorities for each requirement with respect to all other requirements. In other words, the model provided by the partial rankings alone may not describe the relationship between each of the requirements, leaving holes in the overall ranking of all requirements with respect to one another. The machine-learning approach applied by the priority learning module 333 in an embodiment may fill these holes using various types of boosting algorithms applied to the partial rankings received from the priority elicitation module 332.

The priority learning module 333 in an example embodiment may apply the RankBoost algorithm to each of the requirements provided within the partial rankings. The RankBoost algorithm in an embodiment may perform a series of iterations in which a weak classifier is trained to generate a most promising overall ranking that incorporates all of the partial rankings. Each iteration of the RankBoost algorithm may involve adjustment of weighting factors reflecting the importance of each partial rank with respect to the other partial ranks until a single requirement ranking is generated that is in agreement with all of the user-specified partial rankings. The output of such a RankBoost method in an embodiment may include an array of values, each including a weighting factor assigned to a specific requirement. These weighting factors assigned to each requirement in an embodiment as a result of the RankBoost or other boosting algorithm in an embodiment may be referred to herein as requirement ranking factors.

The priority learning module 330 in an embodiment may then rank each of the requirements in order of highest requirement ranking factor to lowest. Such a ranking may be user-centric in that it is entirely predicated on user input in the form of the partial rankings (e.g., pair-wise comparisons). Thus, the resulting ranking may be referred to herein as a user-centric priority requirement ranking in that it also ranks the priority to a user of each requirement for determining the order of replacement for failing hardware components. As described in greater detail below with respect to FIGS. 4 and 6, the sustainability engine 330 in an embodiment may make recommendations about replacement of failing hardware components based partially on this user-centric information, and partially on considerations of $CO_2$ footprints resulting from such recommendations.

The replacement ranking module 334 in an embodiment may receive the user-centric priority requirement ranking factors from the priority learning module 333, $CO_2$ footprint data from a $CO_2$ optimization engine 385, hardware component health information from the systems internal health assessor 383, and values for all requirements for all failing hardware components from telemetry 382. As described above, the priority learning module 333 generates a machine-learning model of a user's decision making process for responding to failure of a plurality of hardware components. In other words, the model generated at the priority learning module 333 ranks the importance to the user of various considerations that would be considered, in the future, if various hardware components failed simultaneously.

This model in an embodiment may be generated prior to such failures, and may thus not depend upon any considerations specific to a given hardware component. The ranking module 334 in an embodiment may apply this general model to specific instances of hardware components identified as failing, and for which values for each requirement are known. The ranking module 334 in an embodiment may receive the user-centric priority requirement ranking factors from the priority learning module 333, an identification of a plurality of failing hardware components from the SIHA 383, a replacement $CO_2$ footprint, and a redistribution $CO_2$ footprint from the $CO_2$ optimization engine 385, and values for all requirements (e.g., cost of replacement, time required to redistribute workload) for all hardware components identified by the SIHA 383 as failing from telemetry 382. Determination of the replacement $CO_2$ footprint and the redistribution $CO_2$ footprint by the $CO_2$ optimization engine 385 in an embodiment may be described in greater detail below with respect to FIG. 5.

In an embodiment, the ranking module 334 may generate a user-centric replacement priority ranking measure and a user-centric redistribution priority ranking measure for each failing component based on the user-centric priority requirement ranking factor and all requirements values for each of the failing components. As described in greater detail with respect to FIG. 4, the ranking module 334 of the sustainability engine 330 in an embodiment may determine a user-centric replacement priority ranking measure and a user-centric redistribution priority ranking measure for each of the failing hardware components by either multiplying or dividing the user-centric priority requirement ranking factor, in one example embodiment, by actual recorded values for these requirements (e.g., received from telemetry 382) as applied to each failing hardware component. The user-centric priority requirement ranking factor describes the importance of each of those requirements to a user when deciding whether to replace a component.

The ranking module 334 in an embodiment may also generate a $CO_2$ optimized replacement priority ranking measure and a CO2 optimized redistribution priority ranking measure for each of the plurality of failing hardware components. In an example embodiment, the ranking module 334 may generate these CO2 optimized ranking measures by weighting the user-centric replacement priority ranking measure and the user-centric redistribution priority ranking measure for each of the failing hardware components by the CO2 footprint for replacement and CO2 footprint for redistribution for each of those components, respectively, as described in greater detail below with respect to FIGS. 4 and 6. The ranking module 334 in an embodiment may recommend replacement or redistribution of workload for various failing hardware components based on the CO2 optimized replacement or redistribution priority ranking measures. For example, and as described in greater detail below with respect to FIG. 6, the ranking module 334 of the sustainability engine 330 in an embodiment may recommend replacement of failing hardware components associated with a highest CO2 optimized replacement priority ranking measure. As another example, and as also described in greater detail below with respect to FIG. 6, the ranking module 334 of the sustainability engine 330 may recommend redistribution of the workload of a failing hardware component if the CO2 optimized redistribution priority ranking measure for that component is greater than the CO2 optimized replacement priority ranking measure. Determinations made by the ranking module 334 in various embodiments described herein may be made based on CO2 optimized ranking measurements, meaning such determinations take into account both the user's priorities in choosing between replacement, redistribution or continuing to operate a failing component and in consideration of the CO2 footprint resulting from the various available solutions to the failure of a plurality of hardware components across an enterprise system.

Figure 4:
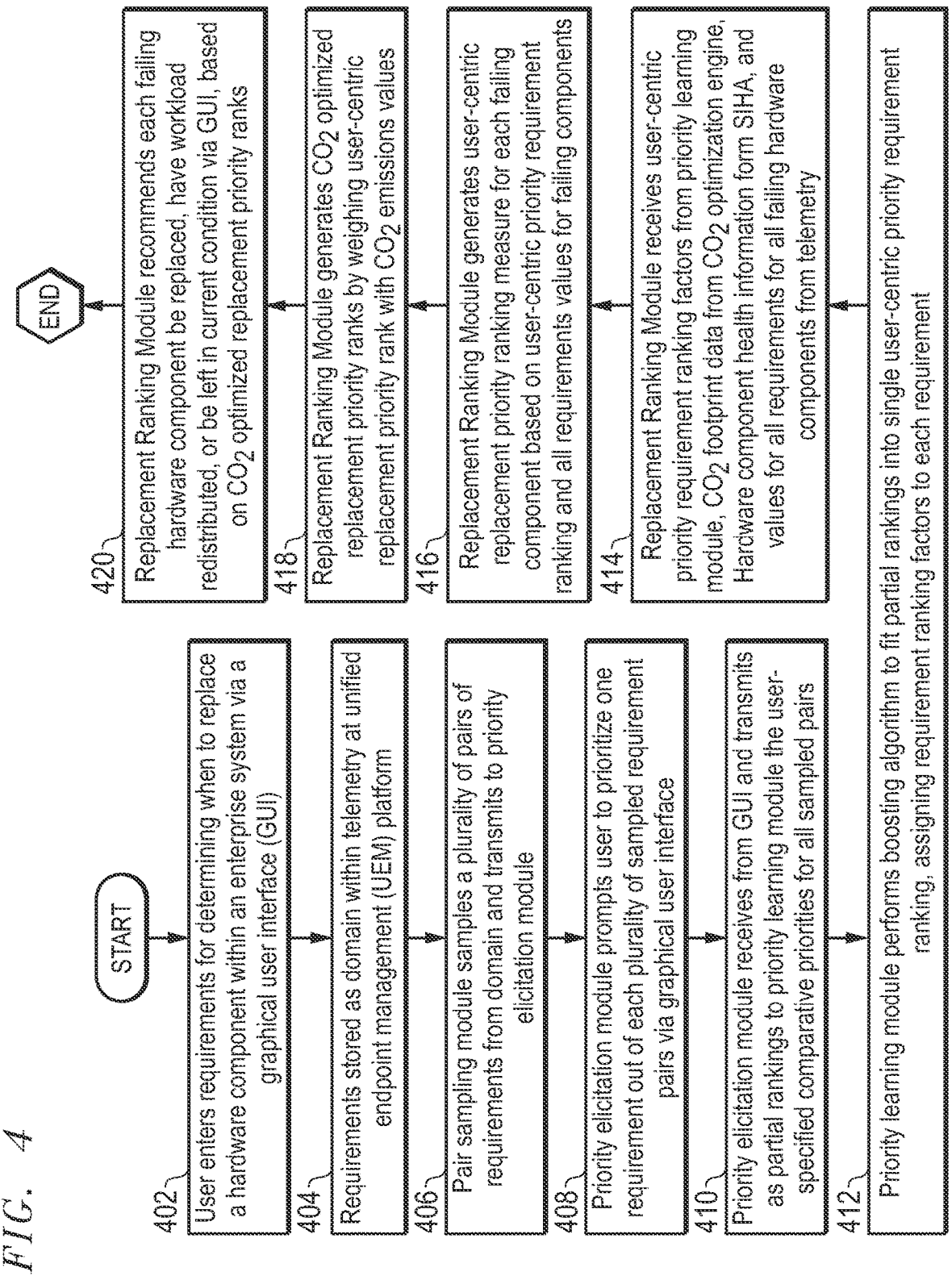
FIG. 4 is a flow diagram illustrating a method of modeling user priorities in choosing a solution for failing hardware components according to an embodiment of the present disclosure.

FIG. 4 is a flow diagram illustrating a method of modeling user priorities in choosing between replacement or redistribution of workload for a plurality of hardware components with assessment of CO2 footprint resulting from either according to an embodiment of the present disclosure. As described herein, determinations made by the ranking module 334 of FIG. 3 above in various embodiments described herein may be made based on CO2 optimized ranking measurements, meaning such determinations take into account both the user's priorities in choosing between replacement or redistribution of workload and the CO2 footprint resulting from various available solutions to the failure state of a plurality of hardware components across an enterprise system.

At block 402, the user may enter requirements for determining when to replace a hardware component within an enterprise system via a graphical user interface (GUI) in an embodiment. For example, in an embodiment described with reference to FIG. 3, the user of the sustainability engine 330 may enter such information via the GUI 384. In an embodiment, the user may enter any considerations regularly taken when deciding whether or when to replace a hardware component identified as failing. In various scenarios described herein, the appropriate solution to failure of a hardware component may include replacement, redistribution of the workload for that hardware component across available alternatives, or continued use of the failing hardware component at a reduced operating efficiency. In an embodiment, continued use of the failing hardware component at a reduced operating efficiency may also affect other devices reliant on the output or operating efficiency of the failing hardware component, which may be referred to herein as downstream devices.

A user may consider several variables for each of these scenarios and compare them against one another to determine the best approach to employ in particular circumstances. For example, a user may consider, requirements for each of those three scenarios (e.g., replacement, redistribution of workload, maintenance of current configuration) relating to the cost, time to implement, change in operating efficiency, or resource consumption of devices relying on functionality of the failing device. In such an example embodiment, a user may enter, via the GUI, each of these requirements considerations, for each of the three available approaches. In other words, in such an example embodiment, the user may provide ten requirements routinely considered when determining a best approach to failure of a given hardware component, including cost of replacement, time to implement replacement, change in operating efficiency afforded by replacement, resource consumption due to replacement, cost of workload redistribution, time to implement workload redistribution, change in operating efficiency afforded by workload redistribution, resource consumption due to workload redistribution, change in operating efficiency of downstream devices due to maintenance of the current configuration, and resource consumption at downstream devices due to maintenance of the current configuration. These are examples of requirements although additional requirements may also be entered in some embodiments.

The above described requirements received via the GUI, as specified by the user, may be stored at the telemetry at block 404. For example, the GUI 384 may transmit the received, user-specified requirements described above with respect to block 402 within the telemetry 382. These requirements may be stored along with actual measured or estimated values for each of these requirements for each of a plurality of failing hardware components within an enterprise system in an example embodiment.

At block 406, the pair sampling module of the sustainability engine may sample a plurality of pairs of requirements from telemetry and transmits them to the priority elicitation module in an embodiment. As described herein, the sustainability engine 330 in an embodiment may generate a machine-learning model for determining an order in which a plurality of failing components should be replaced or have their workloads redistributed that takes into account user-specified priorities (e.g., those described above with respect to block 402) and carbon footprint associated with each potential approach to the failure of those components (e.g., replacement, redistribution of workload, or maintenance of current configuration). Many different machine-learning methods for modeling decision-making processes for users may be employed in various embodiments described herein. For example, the sustainability engine 330 may use a case-based ranking algorithm (CBRank) or an analytical hierarchy process algorithm (AHPA) to make such a determination based on feedback elicited from the user. The method specifically described in FIG. 4 follows the CBRank methodology, which may require less user feedback during this elicitation process than the AHPA method.

The pair sampling module 331 of the CBRank approach in an embodiment may randomly select pairs of requirements supplied by the user via GUI 384 (e.g., as described at block 402) and stored in telemetry 382 (e.g., as described at block 404). For example, the pair sampling module 331 may randomly select, as a first pair of requirements, cost of replacement and change in operating efficiency of downstream devices caused by the failing component. As another example, the pair sampling module 331 may randomly select, as a second pair of requirements, time to implement a redistribution of workload for the failing component and consumption of resources by a replacement part. These sampled pairs in an embodiment may be transmitted to the priority elicitation module 332 in an embodiment. As described in greater detail directly below, a user may be asked to identify which of the two requirements in each pair the user considers to be more critical to a determination of how to remedy a failing hardware component.

The priority elicitation module in an embodiment may prompt the user to prioritize one requirement out of each plurality of sampled requirement pairs via a GUI at block 408. For example, the priority elicitation module 332 in an embodiment may prompt the user via GUI 384 to prioritize consideration of replacement cost or downstream device operating efficiency within the first sampled pair. In other words, prior to a part failing, the user may indicate whether, when a part does eventually fail, she would place more importance on the cost of replacement of the part than on the effect that failure has on downstream devices when deciding whether to replace the part. As another example, the priority elicitation module 332 in an embodiment may prompt the user via GUI 384 to prioritize consideration of time to implement a redistribution of workload for the failing component and consumption of resources by a replacement part. In other words, prior to a part failing, the user may indicate whether, when a part does eventually fail, she would place more importance on the time to implement a redistribution of workload for the failing component or resource consumption by a replacement part when deciding whether to replace the part. The priority learning module 333 in an embodiment may use each of these pair-wise comparisons in an embodiment to learn how to make decisions that reflect the priorities of the user. One method of doing so includes generating a ranking of each of the requirements with respect to one another (e.g., ranking from one to ten for the requirements described above with reference to block 402). Because each pair-wise comparison only ranks two of such requirements with respect to one another, they may be referred to herein as partial rankings.

At block 410, the priority elicitation module in an embodiment may receive from the GUI and transmit as partial rankings to the priority learning module the user-specified comparative priorities for all sampled pairs. For example, the priority elicitation module 332 in an embodiment may transmit each of these partial rankings, as selected by the user via GUI 384 to the priority learning module 333. The priority learning module 333 in an embodiment may use each of these pair-wise comparisons in an embodiment to learn how to make decisions that reflect the priorities of the user. In an embodiment, the priority learning module 333 may operate to generate a model of the user's decision making process that ranks the importance of each of the requirements supplied by the user with respect to one another. In other words, such a model may provide a ranking for all of the user-specified requirements routinely used during consideration of replacement, redistribution of workload, or maintenance of current configuration for a failing hardware component.

In an embodiment in which the user has provided ten of such requirements, for example, the model generated by the priority elicitation module may rank all ten requirements with a value between one and ten. This is only one example embodiment, and other embodiments contemplate potentially large numbers of requirements, which may approach or exceed a hundred in some cases. In such cases, it may be impractical for the user to provide an accurate ranking of each of these considerations or requirements with respect to one another. In such scenarios, the pair-wise sampling method described above with respect to blocks 406 and 408 allow the user to provide discrete and understandable decisions comparing only two of these requirements at a time.

In order to rank each of the requirements with respect to one another through pair-sampling alone, the user would need to provide input via GUI 384 prioritizing each of the requirements against all of the other requirements. For example, in order to accurately rank each of ten requirements with respect to one another using the pair-wise priority solicitation method alone, the user would have to provide one hundred different pair-wise comparisons via GUI 384. In embodiments where the number of requirements provided by the user is significantly greater than ten, the number of pair-wise comparisons elicited from the user via GUI 384 would increase quadratically, into the thousands in some cases. In order to avoid such intensive reliance on user feedback, the priority learning module 333 in an embodiment may operate to use machine-learning to model such a ranking of all requirements with respect to one another based on a random sampling of such pair-wise partial rankings provided by the user. In other words, the priority learning module 333 may not require the user to compare each of the requirements against one another, leaving holes in the overall ranking of all requirements with respect to one another. The machine-learning approach applied by the priority learning module 333 may fill these holes using various types of boosting algorithms applied to the partial rankings received from the priority elicitation module 332.

The priority learning module in an embodiment may perform a boosting algorithm on the received partial rankings to fit the partial rankings into a single, user-centric priority requirement ranking that models the user's perceived importance of each requirement with respect to all other requirements at block 412. For example, the priority learning module 333 in an embodiment may apply the RankBoost algorithm to each of the requirements provided within the partial rankings. The RankBoost algorithm in an embodiment may perform a series of iterations in which a weak classifier is trained to generate a most promising overall ranking that incorporates all of the partial rankings. Each iteration of the RankBoost algorithm may involve adjustment of weighting factors reflecting the importance of each partial rank with respect to the other partial ranks until a single requirement ranking is generated that is in agreement with all of the user-specified partial rankings. The output of such a RankBoost method in an embodiment may include an array of values, each including a weighting factor assigned to a specific requirement. For example, the final weighting factor assigned to the requirement for cost of replacement part may have a value of 6.2, the weighting factor assigned to the requirement for time to redistribute workload may have a value of 1.3, and the increase in operating efficiency due to replacement of a part may have a value of 1.7. These weighting factors assigned to each requirement in an embodiment as a result of the RankBoost or other boosting algorithm in an embodiment may be referred to herein as requirement ranking factors, and a requirement ranking factor may be assigned to each requirement supplied by the user at block 402.

The priority learning module 330 in an embodiment may then rank each of the requirements in order of highest requirement ranking factor to lowest. For example, in an embodiment described directly above, the cost of replacement (e.g., having a requirement ranking factor of 6.2) may be ranked higher than the increase in operating efficiency due to replacement (e.g., having a requirement ranking factor of 1.7) and the time required to redistribute workload (e.g., having a requirement ranking factor of 1.3), and the time required to redistribute workload may be ranked lower than the other two. Such a ranking may be user-centric in that it is entirely predicated on user input in the form of the partial rankings (e.g., pair-wise comparisons). Thus, the resulting ranking may be referred to herein as a user-centric priority requirement ranking in that it also ranks the priority to a user of each requirement for determining the order of replacement for failing hardware components. As described herein, the sustainability engine 330 in an embodiment may make recommendations about replacement of failing hardware components based partially on this user-centric information, and partially on considerations of CO2 footprints resulting from such recommendations.

At block 414, the replacement ranking module may receive the user-centric priority requirement ranking factors from the priority learning module, CO2 footprint data from a CO2 optimization engine, hardware component health information from the systems internal health assessor, and values for all requirements for all failing hardware components from telemetry. As described above, the priority learning module 333 generates a machine-learning model of a user's decision making process for responding to failure of a plurality of hardware components. In other words, the model generated at the priority learning module 333 ranks the importance to the user of various considerations that would be considered, in the future, if various hardware components failed simultaneously.

This model in an embodiment may be generated prior to such failures, and may thus not depend upon any considerations specific to a given hardware component. For example, the model may indicate a user considers the cost of replacement for a part to be more important than the time to redistribute the workload for a part, regardless of which part is actual broken. The remaining blocks 414-420 may apply this general model to specific instances of hardware components identified as failing, and for which values for each requirement are known. For example, the SIHA 383 in an example embodiment may identify a computer hard drive as failing, and the telemetry 382 may store an estimated or known cost of replacement for that computer hard drive, and an estimated time required to redistribute the workload for that computer hard drive. Blocks 414-420 may apply these stored telemetry requirement values for a plurality of failing hardware components, along with CO2 footprint estimations provided by the CO2 optimization engine 385 to provide CO2-conscious recommendations for replacement of various failing hardware components that includes consideration of the user's priorities.

The ranking module 334 in an embodiment may receive the user-centric priority requirement ranking factors from the priority learning module 333, an identification of a plurality of failing hardware components from the SIHA 383, a replacement CO2 footprint, and a redistribution CO2 footprint from the CO2 optimization engine 385, and values for all requirements (e.g., cost of replacement, time required to redistribute workload) for all hardware components identified by the SIHA 383 as failing from telemetry 382. Determination of the replacement CO2 footprint, and redistribution CO2 footprint by the CO2 optimization engine 385 in an embodiment may be described in greater detail below with respect to FIG. 5.

In an embodiment at block 416, the ranking module may generate a user-centric replacement priority ranking measure and a user-centric redistribution priority ranking measure for each failing component based on the user-centric priority requirement ranking factor and all requirements values for each of the failing components. The ranking module 334 of the sustainability engine 330 in an embodiment may determine a user-centric replacement priority ranking measure and a user-centric redistribution priority ranking measure for each of the failing hardware components by either multiplying or dividing the user-centric priority requirement ranking factor (e.g., determined at block 412) describing the importance of each of those requirements to a user when deciding whether to replace a component by actual recorded values for these requirements (e.g., received from telemetry 382 at block 414) applying to each failing hardware component. The user-centric priority requirement ranking factor describing the importance of each of those requirements may be multiplied by actual recorded values for these requirements applying to each failing hardware component when the requirement describes a characteristic whose maximization is desired. For example, a user may wish to maximize an increase in operating efficiency through either replacement or redistribution. In such a scenario, the user-centric replacement priority ranking measure and the user-centric redistribution priority ranking measure for a requirement describing increase in operating efficiency (e.g., through either replacement or redistribution of workload) may be determined by multiplying the user-centric priority requirement ranking factor for an increase in operating efficiency by actual recorded values for an increase in operating efficiency for each failing hardware component in various scenarios (e.g., replacement of the failing hardware component, or redistribution of the workload of the failing hardware component across alternative hardware components).

In a specific example, the change in operating efficiency requirement in an embodiment may have a user-centric priority requirement ranking factor of 1.7, and replacement or redistribution of workload for a computer hard drive may increase operating efficiency from the current configuration across all devices in a system by 6%. In such a scenario, the sustainability engine 330 may determine a user-centric replacement priority ranking measure for the increased operating efficiency requirement and the computer hard drive to be 0.102. As another example, the increased operating efficiency requirement in an embodiment may have a user-centric priority requirement ranking factor of 1.7, and replacement of the fan or increasing the workload of other fans may increase operating efficiency of the overall fans of a device, cooling unit, or cooling room in an enterprise system by 24%. In such a scenario, the sustainability engine 330 may determine a user-centric replacement priority ranking measure for the cost of replacement requirement and the component of interest to be 0.408.

As another example, a user may wish to minimize cost, time of implementation, or resource consumption through either replacement or redistribution. In such a scenario, the user-centric priority requirement ranking measure for a requirement describing increase in operating efficiency may be determined by dividing the user-centric priority requirement ranking factor for a cost, time to implement, or resource consumption by actual recorded values for cost, time to implement, or resource consumption for each failing hardware component in various scenarios (e.g., replacement of the failing hardware component, redistribution of the workload of the failing hardware component across alternative hardware components).

In a specific example, the cost of replacement requirement in an embodiment may have a user-centric priority requirement ranking factor of 6.2, and the cost of replacement for a computer hard drive may be $0.378 per day, based on an overall cost of $275 and an estimated life span of two years. In such a scenario, the sustainability engine 330 may determine a user-centric replacement priority ranking measure for the cost of replacement requirement and the computer hard drive to be 16.4 As another example, the cost of replacement requirement in an embodiment may have a user-centric replacement priority ranking factor of 6.2, and the cost of replacement for a fan may be $2.74 per day, based on an overall cost of $15,000 and an estimated life span of 15 years for an installed industrial cooling fan in, for example, a server cooling room. In such a scenario, the sustainability engine 330 may determine a user-centric replacement priority ranking measure for the cost of replacement requirement and the fan to be 2.26.

At block 418, the ranking module may generate a CO2 optimized replacement priority ranking measure and a CO2 optimized redistribution priority ranking measure for each of the plurality of failing hardware components in an embodiment. The ranking module 334 in an example embodiment may generate these CO2 optimized ranking measures by weighting the user-centric replacement priority ranking measure and the user-centric redistribution priority ranking measure (e.g., as determined at block 416) for each of the failing hardware components by the CO2 footprint for replacement and CO2 footprint (e.g., as received at block 414) for redistribution for each of those components, respectively, as described in greater detail below with respect to one embodiment described in FIG. 6. Any weighting of CO2 footprint factors may be used to transform the user-centric replacement priority ranking measure and the user-centric redistribution priority ranking measure to the CO2 optimized replacement priority ranking measure and a CO2 optimized redistribution priority ranking measure respectively in embodiments herein with a CO2 footprint weighting factor for particular failing components.

The ranking module in an embodiment may recommend replacement or redistribution of workload for various failing hardware components based on the CO2 optimized replacement or redistribution priority ranking measures at block 420. For example, and as described in greater detail below with respect to FIG. 6, the ranking module 334 of the sustainability engine 330 in an embodiment may recommend replacement of failing hardware components associated with a highest CO2 optimized replacement priority ranking measure. As another example, and as also described in greater detail below with respect to FIG. 6, the ranking module 334 of the sustainability engine 330 may recommend redistribution of the workload of a failing hardware component if the CO2 optimized redistribution priority ranking measure for that component is greater than the CO2 optimized replacement priority ranking measure. Determinations made by the ranking module 334 in various embodiments described herein may be made based on CO2 optimized ranking measurements, meaning such determinations take into account both the user's priorities in choosing between and the CO2 footprint resulting from various available solutions to the failure of a plurality of hardware components across an enterprise system. The method for modeling user priorities in choosing a solution for failing hardware components may then end.

Figure 5:
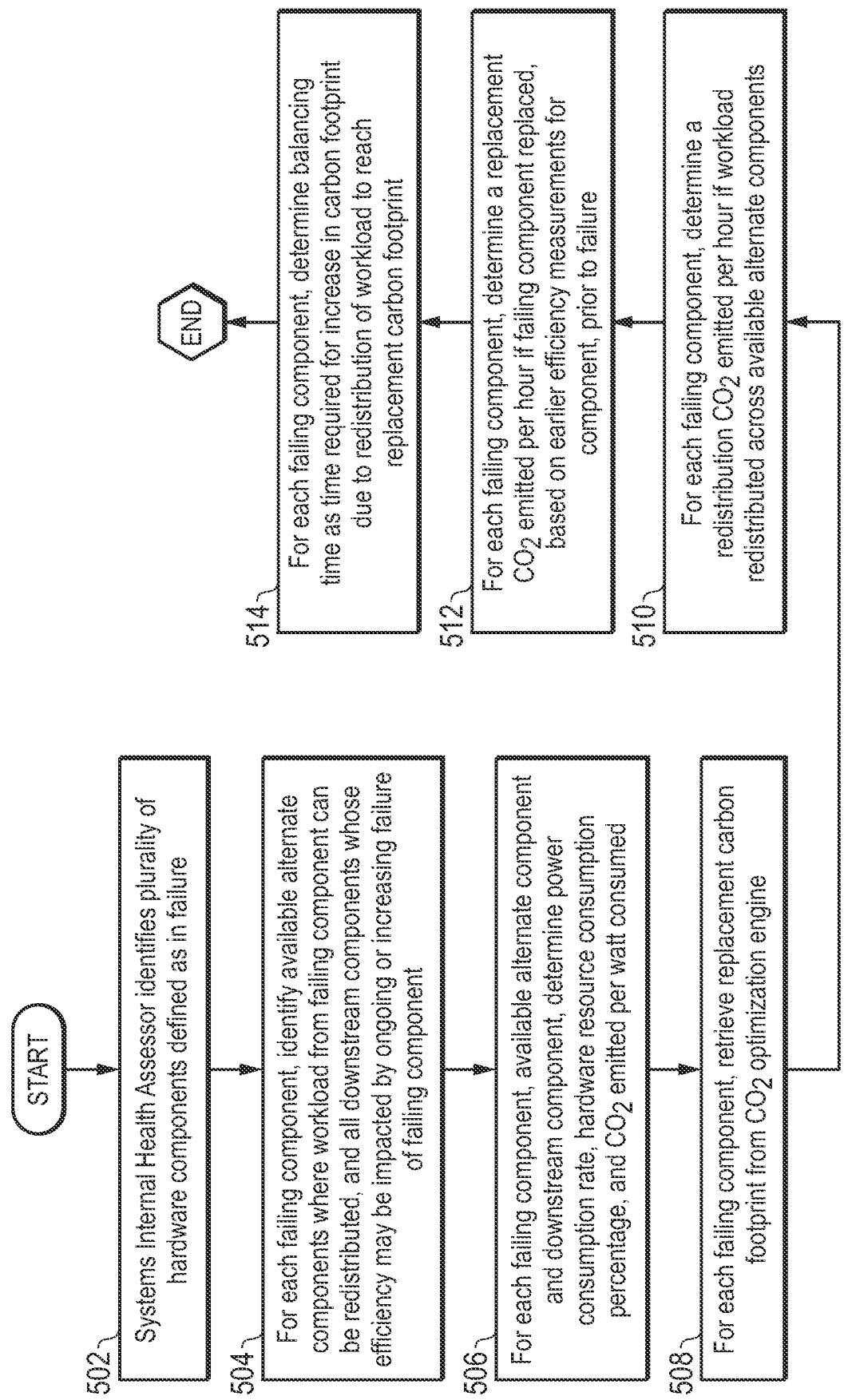
FIG. 5 is a flow diagram illustrating a method of estimating carbon dioxide ($CO_2$) emissions that may result from replacement or workload redistribution according to an embodiment of the present disclosure.

FIG. 5 is a flow diagram illustrating a method of estimating carbon dioxide (CO2) emissions that may result from hardware component replacement or workload redistribution for a plurality of failing hardware components across an enterprise system according to an embodiment of the present disclosure. As described herein, determinations made by the sustainability engine in various embodiments described herein may take into account both the user's priorities in choosing between replacement or workload redistribution and the CO2 footprint resulting from various available solutions to the failure of a plurality of hardware components across an enterprise system. FIG. 5 describes methods of determining CO2 footprint associated with replacement or redistribution of workload for a failing hardware component in various embodiments.

At block 502 in an embodiment, the systems internal health assessor (SIHA) may identify a plurality of hardware components defined as in failure (i.e., in a failure state of operation). A hardware failure does not necessarily refer to a completely failed component of hardware, but more often refers to a performance state of a component of hardware falling below an operating performance minimum in embodiments herein. However, complete failure of a component part or one of an array of component parts may comprise a failure state as well in various embodiment. For example, in an embodiment described with reference to FIG. 2, the SIHA 283 may search telemetry 282 data to identify indications within received application analytics, power analytics, or event viewer logs of hardware failures, errors, or underperformance at reporting client information handling systems (e.g., 250 or 270). For example, the SIHA 283 in an embodiment may search such analytics or logs stored in telemetry 282 to identify an error at the memory 246 of the first information handling system 250 and an error at the cooling room fan 299. As described above, any of a number of WHEA or other conventionally recorded errors may appear within event viewer 265 logs and may identify any of the hardware components (e.g., 220, 241, 242, 243, 244, 245, 246, 247, 248, or 249) operating at the client information handling systems 250 and 270 in an embodiment. In another embodiment, the enterprise management system 205 may routinely check sensors, such as temperature sensor 298 or power consumption of the cooling room fan 299 to determine when the cooling room fan 299 is drawing excessive power, drawing no power (e.g., inoperable), or failing to maintain a maximum temperature threshold, as determined by the temperature sensor 298. Upon identification of such an error associated with an identified hardware component, the SIHA 283 may transmit a notification to the sustainability engine 281 identifying the failing hardware component (e.g., memory 246 or cooling room fan 299).

In other embodiments, the SIHA 283 may determine that a component is failing if one or more event logs for the information handling system (e.g., 250) using that hardware component (e.g., 246) include a number of errors for that component (e.g., 246) that meets or exceeds a maximum error threshold (e.g., 100, 50, 10, 5) within a preset period of time (e.g., 24 hours). As another example, the SIHA 283 may determine that a component is failing if one or more event logs for the information handling system (e.g., 250) indicate a test benchmark score for that component (e.g., 246) that falls below a preset minimum benchmark threshold value (e.g., 85% of average crowd-sourced benchmark value). More specifically, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200.

In an embodiment at block 504, for each hardware component identified by the SIHA as failing, the sustainability engine may identify available alternate components where workload from the failing component may be redistributed, and all downstream hardware components whose operating efficiency may be impacted by ongoing or increasing failure of the failing component. For example, in an embodiment in which the SIHA identifies the memory 246 of the first client information handling system 250 as failing, the sustainability engine 281 may refer to telemetry to identify one or more other memory devices (e.g., 272) to which the workload from the memory 246 may be redistributed. In another aspect of such an embodiment, the sustainability engine 281 may identify the CPU 242 as a downstream device whose operating efficiency may be decreased due to continued operating inefficiency or failure of the memory 246, for example.

As another example, in an embodiment, the SIHA may identify the fan 299 as failing to cool a room in which the first and second information handling systems (e.g., 250 and 270) are currently operating, as determined based on location data for all three devices (e.g., 299, 250, and 270) stored in telemetry. In such an embodiment, the sustainability engine 281 may identify the first client information handling system 250 and the second client information handling system 270 as downstream devices whose operating efficiency may be decreased as a result of ongoing failed performance of the cooling room fan 299, due to increased internal temperature. In another aspect of such an embodiment, the sustainability engine 281 may identify the fan 273 of the first client information handling system 250 and the fan 273 of the second client information handling system 270 as downstream devices to which the workload of the cooling room fan 299 may be redistributed, based on the fact that the fans (e.g., 241 and 273) may experience increased workload as a natural consequence of operating inefficiency or failure of the cooling room fan 299. In still another aspect of such an embodiment, the sustainability engine may identify one or more other cooling room fans within the same cooling room (e.g., not located within information handling systems) to which the workload for the failing cooling room fan may be redistributed. Alternatively, workload on the downstream information handling systems (e.g., servers) in the cooling room may also be impacted by a cooling room fan in a failure state where redistribution to other information handling systems at other cooling rooms may be warranted in another embodiment.

At block 506, for each failing component, each available alternate component (e.g., capable of handling a redistributed workload), and each downstream component, the sustainability engine may determine a power consumption rate, a hardware resource consumption percentage and a CO2 emitted per watt consumed. These values in an embodiment may be used to determine a CO2 footprint likely to result from replacement, workload redistribution, or continued failure or operating inefficiency of the failing hardware component, as described in greater detail below with respect to blocks 514-518. For example, the sustainability engine 281 in an embodiment may determine a power consumption rate and a hardware resource consumption percentage (e.g., describing a percentage of available resources for a given hardware component) based on power analytics and application analytics stored in telemetry 282 for the failing hardware components identified at block 502, and the available alternate components and downstream components identified at block 504.

In addition, for each of these identified components (e.g., failing, available alternatives, downstream), the sustainability engine 281 may retrieve from the CO2 optimization engine 285 a measure or estimation of CO2 emitted per watt consumed. As described herein, the CO2 optimization engine 285 in an embodiment may store information such as known statistics for GHG emissions due to power consumption in the measured location of a client information handling system (e.g., 250). Upon receipt of the telemetry identifying the location of the first client information handling system 250 in an embodiment, the sustainability engine 281 may retrieve a distributed power CO2 emissions value describing CO2 emitted per Watt of power consumed for the geographic location of the first client information handling system 250 during the current monitoring period from the CO2 optimization engine 285. For example, the sustainability engine 281 may work with the $CO_2$ optimization engine 285 to determine a distributed power CO2 emissions value of 0.85 pounds of CO2 per kilowatt hour (kWh) for each of the reporting client information handling systems (e.g., 250 and 270) based on their measured geographic locations, as received at the sustainability engine 281 and stored in telemetry 282. As described herein, the distributed power CO2 emissions value in an embodiment may describe the amount of CO2 or other GHGs emitted during generation of each Watt of power at a specific power plant providing power to all devices within an area including the geographic location of a client information handling system (e.g., 250 or 270). The amount of GHG emitted per Watt of power may differ widely across such power plants, based on the method of power production (e.g., solar power vs. coal-burning plant). Thus, the distributed power CO2 emissions value (e.g., in CO2 pounds per Watt) may vary markedly between geographic locations.

The sustainability engine in an embodiment at block 508 may retrieve, for each hardware component identified as failing at block 502, a replacement carbon footprint value from the CO2 optimization engine. For example, the CO2 optimization engine 285 in an embodiment may store known values for CO2 or other GHGs emitted during the manufacture and transport of the hardware component(s) (e.g., 246 or 299) identified at block 502 as failing. More specifically, the CO2 optimization engine 285 in an embodiment may retrieve the CO2 footprint of 20 pounds associated with manufacture of a memory device (e.g., computer hard drive) capable of replacing the failing memory 246 (e.g., having similar capabilities) from the CO2 optimization engine 285. In another example, the CO2 optimization engine 285 in an embodiment may retrieve the CO2 footprint of 800 pounds associated with manufacture of an industrial fan capable of replacing the cooling room fan 299 (e.g., having similar capabilities) from the CO2 optimization engine 285. The replacement CO2 footprints for various hardware components stored at the CO2 optimization engine 285 in an embodiment may be determined by the manufacturers for such components and accessible from a database.

The sustainability engine in an embodiment at block 510 may determine, for each failing component identified at block 502, an estimated redistribution CO2 that would be emitted per hour if the workload for the failing component were distributed across the plurality of available alternates.

For example, the sustainability engine 281 may first estimate power that would be consumed at the available alternate components upon redistribution of the workload for the failing component. For example, the failing memory 246 in an embodiment may be associated with a memory resource consumption rate of 95%, indicating that the various other hardware components (e.g., 220, 242, 243, 244, 245, 247, 248, and 249) of the first client information handling system 250 are currently consuming 95% of the memory 246 resources (e.g., storage space, calls to storage). The sustainability engine 281 in such an embodiment may have also determined at block 504 that there are ten other memory devices (e.g., including memory 272 of the second information handling system 270) capable of handling a portion of the workload currently handled at the memory 246 of the first client information handling system 250. In such an embodiment, the sustainability engine 281 could then estimate an increase in memory resource consumption of 9.5% across all of the available alternative memory devices identified at block 504.

The sustainability engine 281 in an embodiment may also determine a percentage of power consumed by these alternate memory devices (e.g., 272) at their various geographic locations and information handling systems (e.g., 270). For example, the sustainability engine 281 may determine the memory 272 of the client information handling system 270 is currently consuming 10% of all power drawn by the client information handling system 270, or a total of 120 W. The sustainability engine 281 may estimate that a 9.5% increase in usage of the memory 272 (e.g., as reflected by the estimated increase of 9.5% in memory resource consumption across all available alternative memory devices) may also result in a 9.5% increase in the power consumed by the memory 272. Thus, the sustainability engine 281 may estimate that redistribution of the workload for the failing memory 246 across all of the available alternate memory devices, including 272, would cause an increase in power consumption at the second client information handling system 270 of 11.4 W. Based on the estimated CO2 per Watt of pounds/kWh consumed by the second client information handling system 270 determined at block 506, the sustainability engine may determine that redistribution of the workload from the memory 246 across ten alternate memory devices, including 272, may result in emission of pounds of CO2 per hour of use of the memory 272 at the second information handling system 270. The sustainability engine 281 in an embodiment may perform this same analysis on each of the other nine available alternate memory devices across which the workload for the failing memory 246 may be distributed. The CO2 that may be emitted per hour at each of these other nine memory devices may be summed to determine a total CO2 emissions per hour that may result from redistribution of the workload for memory 246 across ten alternate memory devices, including memory 272. For example, the sustainability engine 281 may determine that the sum across all ten alternate memory devices may amount to 0.097 pounds of CO2 per hour.

At block 512, the sustainability engine in an embodiment may determine for each failing component, a replacement CO2 emitted per hour if the failing component were replaced, based on earlier operating efficiency measurements for the component recorded prior to the identified failure. For example, the sustainability engine 281 in an embodiment may make such a determination based on peak operating efficiency experienced by the now failing memory 246 prior to such failure. This may provide an estimate of the peak operating efficiency that may be expected from a replacement memory device. More specifically, the sustainability engine 281 may refer to power analytics or application analytics stored in telemetry 282 to determine that the memory 246 consumed a minimum of 100 W prior to the failure identified at block 502.

In such an embodiment, the sustainability engine 281 may estimate that the replacement memory device for memory 246 may also consume a minimum of 100 W. In other embodiments, such an estimated power consumption for a replacement part may be determined by referencing projected power consumption provided by a manufacturer of the device. The sustainability engine 281 in an embodiment may determine a replacement CO2 emitted per hour by multiplying the CO2 emitted per watt by the estimated minimum power consumption of the replacement memory device. For example, in an embodiment in which the $CO_2$ emitted per watt determined at block 506 is 0.85 per kWh, the sustainability engine 281 may determine a replacement CO2 emitted per hour of 0.085 pounds of CO2 per hour. In other words, the sustainability engine may estimate that, for each hour of operation, the replacement memory device may emit 0.085 pounds of CO2.

At block 514, the sustainability engine in an embodiment may determine a balancing time period as the time required for an increase in carbon footprint due to redistribution of workload to be equivalent to the replacement carbon footprint retrieved at block 508. As described in greater detail below with respect to block 604, the CO2 balancing time value may indicate how long workload for the component of interest would need to be redistributed before the increase in CO2 emissions resulting from that redistribution exceeds the CO2 emitted during manufacture, transport, and installation of a replacement for the component of interest. In other words, the CO2 balancing time value may indicate a period of time in which replacing the component of interest causes an overall increase in CO2 emissions, rather than a decrease. As described in greater detail below with respect to FIG. 6, determination that replacing the component of interest causes more CO2 emissions than redistribution of the workload for the component of interest may impact the recommended solution to failure of the hardware component.

In an example embodiment, the sustainability engine 281 in an embodiment may determine the balancing time period based on the replacement carbon footprint retrieved at block 508, and the redistribution CO2 emitted per hour determined at block 510. For example, the sustainability engine 281 in an embodiment may determine at block 508 that the replacement carbon footprint describing CO2 emitted during manufacture of a replacement part may be 20 pounds of CO2 and determine at block 510 that the redistribution CO2 emitted per hour is equivalent to 0.097 pounds of CO2 emissions per hour. The sustainability engine in such an embodiment may determine the balancing time period is equivalent to 206.39 hours. In such a way, the sustainability engine 281 may determine that redistributing the workload from memory 246 to available alternate memory devices (e.g., including 272) for 206.39 hours may result in an equivalent emission of CO2 as the manufacture and transport of the replacement part for the memory 246. In other words, replacing the memory 246 may result in a higher carbon footprint than redistribution of the workload for the memory 246 until that workload has been redistributed for at least 206.39 hours, or 8.6 days. This may indicate that other, more critically failing components could be replaced during this 8.6 day period, as described in greater detail below with respect to FIG. 6. In such a way, the sustainability engine 281 may work with the CO2 optimization engine 285 to gauge CO2 footprints that would result from replacement or workload redistribution for various failing hardware components. The method of estimating CO2 emissions that may result from replacement or workload redistribution for a plurality of failing hardware components across an enterprise system may then end.

Figure 6:
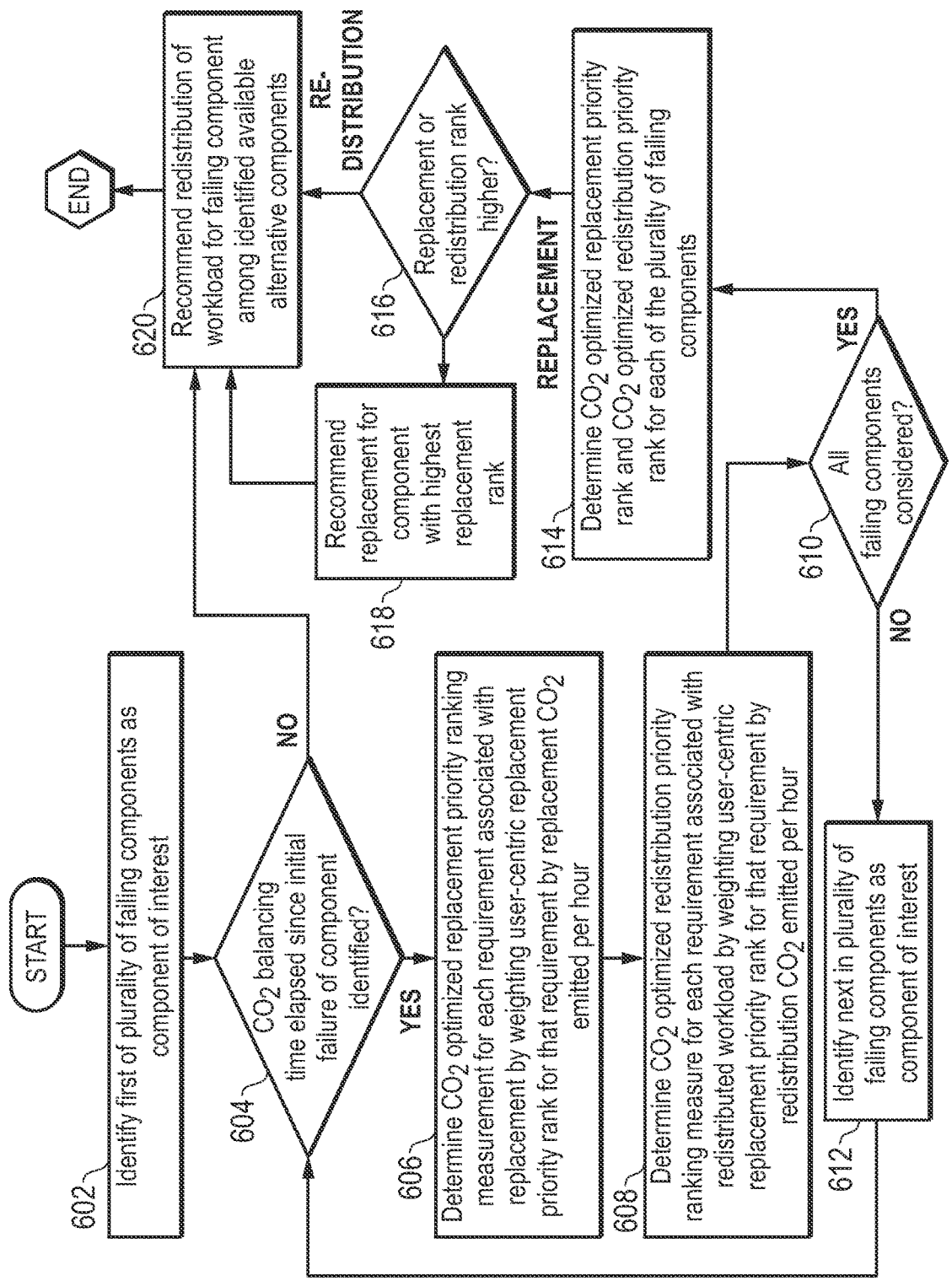
FIG. 6 is a flow diagram illustrating a method of recommending replacement or redistribution of workload for a failing hardware component according to an embodiment of the present disclosure.

FIG. 6 is a flow diagram illustrating a method of recommending replacement or redistribution of workload for a failing hardware component based on CO2 footprint consequences of replacement or redistribution according to an embodiment of the present disclosure. As described herein, the hardware R2R prioritization system in embodiments of the present disclosure addresses this issue by weighting a user-centric ranking for each of several currently failing hardware components determined using a machine-learning priority ranking method by estimated or determined carbon footprints resulting from each available solution (e.g., replacement or workload redistribution). By weighting the user-centric rankings in such a manner, the hardware R2R prioritization system may make CO2 optimized recommendations for the order in which various hardware components for a plurality of client information handling systems across an enterprise system may be replaced or have their workloads redistributed across available backups in order to minimize the CO2 footprint for the enterprise system.

At block 602, the sustainability engine in an embodiment may identify one of a plurality of hardware components identified by the systems internal health assessor (SIHA) as currently failing as a component of interest. For example, as described in an embodiment with respect to FIG. 2 and in FIG. 5 at block 502, the SIHA 283 may identify a plurality of hardware components across a plurality of client information handling systems as currently in a failure state, also referred to herein as in failure. As described herein, such a determination may be made based on a number of errors associated with that component within a preset time period meeting a maximum error threshold, or upon a test benchmark score falling below a minimum benchmark value, for example. The sustainability engine 281 in an embodiment may identify a first of a plurality of such failing hardware components as a component of interest for consideration of replacement or redistribution of workload.

The sustainability engine at block 604 may determine whether a CO2 balancing time value has elapsed since initial failure of the component of interest in an embodiment. As described above in FIG. 5, at block 514, the CO2 balancing time value may indicate how long workload for the component of interest would need to be redistributed before the increase in CO2 emissions resulting from that redistribution exceeds the CO2 emitted during manufacture, transport, and installation of a replacement for the component of interest. In other words, the CO2 balancing time value may indicate a period of time in which replacing the component of interest causes an overall increase in CO2 emissions, rather than a decrease. In a scenario in which replacing the component of interest causes more CO2 emissions than redistribution of the workload for the component of interest, the replacement priority rank for the component of interest may not require any weighting based on CO2 emissions. In other words, it may not be necessary to consider CO2 emissions when determining replacement priority rank for the component of interest. The sustainability engine 281 in an embodiment may apply such a CO2 weighting to the replacement priority rank for all other components of interest in which replacement of the component of interest provides the lowest CO2 footprint in comparison to redistribution of the workload or continued and unaltered operation of the failing component of interest. If the CO2 balancing time value has elapsed since the initial failure of the component of interest, indicating replacement of the component of interest may provide a lower CO2 footprint than other approaches, the method may proceed to block 606 for application of a CO2 weighting to the user-centric replacement priority rank for the component of interest in various scenarios. If the CO2 balancing time value has not elapsed since the initial failure of the component of interest, indicating replacement may increase CO2 footprint in comparison to other approaches, the method may proceed to block 620 for recommendation of redistribution of the workload for the component of interest.

At block 606, in an embodiment in which the $CO_2$ balancing time value has elapsed since the initial failure state of the component of interest, indicating replacement of the component of interest may provide a lower CO2 footprint than other approaches, the sustainability engine may determine a CO2 optimized replacement priority ranking measure for each failing component. In an embodiment, the sustainability engine 281 may first identify requirements associated with the replacement approach, such as cost of replacement, time to implement the replacement, change in operating efficiency across a plurality of devices resulting from replacement, or change in resource consumption across a plurality of devices resulting from replacement.

As described in FIG. 4 at block 416, the replacement ranking module of the sustainability engine may have determined a user-centric replacement priority ranking measure for each of these requirements as applied to each of the failing hardware components by either multiplying or dividing the user-centric priority requirement ranking factor by actual recorded values for these requirements applying to each failing hardware component. As described above in FIG. 4, the user-centric priority requirement ranking factor describes the importance of each of the above-described requirements to a user when deciding whether to replace a component. For example, the user-centric priority requirement ranking measure for a requirement describing increase in operating efficiency, maximization of which may be the goal of replacement of the component of interest, may be determined by multiplying the user-centric priority requirement ranking factor for an increase in operating efficiency by an estimated increase in operating efficiency that would result from replacement of the component of interest. More specifically, the user-centric priority replacement ranking measure for an operating efficiency for a computer hard drive in an embodiment may be 0.102, where the operating efficiency increase requirement has a user-centric priority ranking factor of 1.7 and replacement of the computer hard drive would result in an estimated 6% increase in operating efficiency across all computer hard drives in an enterprise system. As another example, the user-centric priority replacement ranking measure for an operating efficiency for a fan in an embodiment may be 0.408, where the operating efficiency increase requirement has a user-centric priority ranking factor of 1.7 and replacement of the fan would result in an estimated 24% increase in operating efficiency across all fans of a device, cooling unit, or cooling room in an enterprise system.

In still another example, the user-centric replacement priority ranking measure for a requirement describing cost of replacement, minimization of which may be the goal of replacement of the component of interest, may be determined by dividing the user-centric priority requirement ranking factor for cost of replacement by the actual cost of replacing the component of interest. More specifically, the user-centric replacement priority ranking measure for cost of replacement for a computer hard drive in an embodiment may be 16.4, where the cost of replacement requirement has a user-centric priority requirement ranking factor of 6.2 and cost of replacement of the computer hard drive is $0.378 per day, based on an overall cost of $275 and an estimated life span of two years. In another example, the user-centric replacement priority ranking measure for cost of replacement for a fan in an embodiment may be 2.26, where the cost of replacement requirement has a user-centric priority requirement ranking factor of 6.2 and cost of replacement of the fan for a cooling room (e.g., server room) is $2.74 per day, based on an overall cost of $1,000 and an estimated life span of one year.

The $CO_2$ optimized replacement priority ranking measure in an embodiment may be determined for the component of interest and for the requirements associated with the replacement approach to weight the replacement option based on $CO_2$ emissions considerations. $CO_2$ optimized replacement priority ranking measure in a particular embodiment may be determined by dividing the user-centric replacement priority ranking measure for those requirements by the $CO_2$ emissions estimated to result from replacement of the component of interest. For example, in an embodiment described with reference to FIG. 5 at block 514, the $CO_2$ optimization engine may determine a replacement $CO_2$ emitted per hour assuming replacement of the component of interest. More specifically, the $CO_2$ optimization engine may determine a replacement $CO_2$ emitted per hour resulting from replacement of a computer hard drive to be 0.085 pounds of $CO_2$ per hour. In such an example embodiment, the $CO_2$ optimized replacement priority ranking measure relating to the cost of replacement for the computer hard drive may be 1.392. In another example, the $CO_2$ optimization engine may determine a replacement change in $CO_2$ emitted per hour resulting from replacement of a fan to be 1.45 pounds of $CO_2$ per hour. In such an example embodiment, the $CO_2$ optimized replacement priority ranking measure relating to the cost of replacement for the fan may be 3.28. Comparison of the user-centric replacement priority ranking measures relating to the cost of replacement for the computer hard drive and the fan in an embodiment may indicate that the computer hard drive should be replaced before the fan when considering cost of the components alone (e.g., user-centric replacement priority ranking measure for computer hard drive significantly higher at 16.4 in comparison to 2.26 for the fan). However, when taking the decrease in carbon footprint resulting from the replacement of either of these components into account, the $CO_2$ optimized replacement priority ranking measures relating to the cost of replacement for the computer hard drive and the fan in an embodiment may indicate that the fan should be replaced before the computer hard drive (e.g., $CO_2$ replacement priority ranking measure for computer hard drive lower at 1.392 in comparison to 3.28 for the fan).

The sustainability engine in an embodiment may determine an overall $CO_2$ optimized replacement priority ranking measure for each failing component in an embodiment by summing the $CO_2$ optimized replacement priority ranking measure for each requirement associated with replacement of the component of interest together. For example, the overall $CO_2$ optimized replacement priority ranking measure for each failing component in an embodiment may be equivalent to the sum of the $CO_2$ optimized replacement priority ranking measure for the cost of replacement, the $CO_2$ optimized replacement priority ranking measure for the time required to replace, the $CO_2$ optimized replacement priority ranking measure for the increase in operating efficiency resulting from replacement, and the $CO_2$ optimized replacement priority ranking measure for consumption of resources due to replacement.

The sustainability engine at block 608 may determine a $CO_2$ optimized redistribution priority ranking measure for each failing component. In an embodiment, the sustainability engine 281 may first identify requirements associated with the redistribution approach, such as cost of redistribution, time to implement the redistribution, change in operating efficiency across a plurality of devices resulting from redistribution, or change in resource consumption across a plurality of devices resulting from redistribution. As described in FIG. 4 at block 416, the replacement ranking module of the sustainability engine 281 may have determined a user-centric redistribution priority ranking measure for each of these requirements and for each of the failing hardware components by either multiplying or dividing the user-centric priority requirement ranking factor by actual recorded values for these requirements applying to each failing hardware component. As described with reference to the embodiment of FIG. 4, user-centric priority requirement ranking factor describes the importance of each of the above specified requirements to a user when deciding whether to redistribute a workload of a component. For example, the user-centric priority redistribution ranking measure for an operating efficiency for a computer hard drive in an embodiment may be 0.034, where the operating efficiency increase requirement has a user-centric priority ranking factor of 1.7 and redistribution of the computer hard drive workload would result in an estimated 2% increase in operating efficiency across all computer hard drives in an enterprise system. As another example, the user-centric priority redistribution ranking measure for an operating efficiency for a fan in an embodiment may be 0.085, where the operating efficiency increase requirement has a user-centric priority ranking factor of 1.7 and redistribution of the workload of the fan would result in an estimated 5% increase in operating efficiency across all fans of a device, cooling unit, or cooling room in an enterprise system.

In still another example, the user-centric replacement priority ranking measure for a requirement describing time required to redistribute workload, minimization of which may be the goal of redistribution of the workload for the component of interest, may be determined by dividing the user-centric priority requirement ranking factor for time of redistribution by the actual time of redistributing the workload for the component of interest. More specifically, the user-centric redistribution priority ranking measure for time of workload redistribution for a computer hard drive in an embodiment may be 0.41, where the time of redistribution requirement has a user-centric priority requirement ranking factor of 1.3 and time to redistribute workload of the computer hard drive is estimated at 3.2 hours. In another example, the user-centric redistribution priority ranking measure for time to redistribute workload for a fan in an embodiment may be 5.2, where the time to redistribute workload requirement has a user-centric priority requirement ranking factor of 1.3 and time to redistribute the workload of the fan is 15 minutes.

The $CO_2$ optimized replacement priority ranking measure for the component of interest in an embodiment may account for $CO_2$ emissions according to embodiments herein. The $CO_2$ optimized replacement priority ranking measure in an embodiment may be determined by multiplying the user-centric replacement priority ranking measure for requirements relating to redistribution of workload by the $CO_2$ emissions estimated to result from redistribution of the workload of the component of interest. For example, in an embodiment described with reference to FIG. 5 at block 510, the CO2 optimization engine may determine a redistribution CO2 emitted per hour assuming redistribution of the workload of the component of interest. More specifically, the CO2 optimization engine may determine a redistribution CO2 emitted per hour resulting from redistribution of the workload of a computer hard drive to be 0.097 pounds of CO2 per hour. In such an example embodiment, the CO2 optimized replacement priority ranking measure relating to the time to redistribute workload for the computer hard drive may be 0.1261. In another example, the CO2 optimization engine may determine a replacement CO2 emitted per hour resulting from redistribution of workload of a fan to be 0.5 pounds of CO2 per hour. In such an example embodiment, the CO2 optimized replacement priority ranking measure relating to the time to redistribute workload for the fan may be 0.65. Comparison of the user-centric redistribution priority ranking measures relating to the time to redistribute workload for the computer hard drive and the fan in an embodiment may indicate that the fan workload should be redistributed before the workload for the computer hard drive when considering time to redistribute workload alone, likely because the time to redistribute workload of the fan is significantly shorter than the time to redistribute workload of the computer hard drive. When taking the decrease in carbon footprint resulting from the replacement of either of these components into account, the CO2 optimized replacement priority ranking measures relating to the time to redistribute workload for the computer hard drive and the fan in an embodiment may further enforce that the workload for the fan should be redistributed before the workload for the computer hard drive.

The sustainability engine in an embodiment may determine an overall CO2 optimized redistribution priority ranking measure for each failing component in an embodiment by summing the CO2 optimized redistribution priority ranking measure for each requirement associated with redistribution of the workload of the component of interest together. For example, the overall CO2 optimized redistribution priority ranking measure for each failing component in an embodiment may be equivalent to the sum of the CO2 optimized redistribution priority ranking measure for the cost of redistribution, the CO2 optimized redistribution priority ranking measure for the time required to redistribute, the CO2 optimized redistribution priority ranking measure for the increase in operating efficiency resulting from redistribution, and the CO2 optimized redistribution priority ranking measure for consumption of resources due to redistribution.

At block 610, the sustainability engine in an embodiment may determine whether CO2 optimized priority ranking measures have been determined for all failing components for which the CO2 balancing time period has elapsed. If the overall CO2 optimized replacement priority ranking measure and the overall CO2 optimized redistribution priority ranking measure have not been determined for each of the components identified as failing, the method may proceed to block 612 for identification of the next in the plurality of failing components as the component of interest. If the overall CO2 optimized replacement priority ranking measure and the overall CO2 optimized redistribution ranking priority measure have been determined for each of the components identified as failing, the method may proceed to block 614 for determination of a CO2 optimized replacement priority rank and CO2 optimized redistribution priority rank for each of the plurality of failing components.

In an embodiment in which some of the failing components have not been analyzed for CO2 optimization of associated priority ranking measures, the sustainability engine may identify the next in a plurality of failing components as the component of interest at block 612. The method may then proceed back to block 604 for determination as to whether the CO2 balancing time period has elapsed. By repeating the loop between blocks 604 and 612 in such a way, the sustainability engine in an embodiment may determine an overall CO2 optimized redistribution priority ranking measure and an overall CO2 optimized replacement priority ranking measure for each failing component for which replacement is a potential solution. As described in greater detail directly below, these measures may be used to priority replacement of one or a subset of the failing components above replacement of the remainder of the plurality of failing components.

At block 614, the sustainability engine in an embodiment in which overall CO2 optimized priority ranking measures have been determined for all failing components for which replacement is a potential solution may determine priority ranks for all failing components. For example, the sustainability engine in an embodiment may determine a CO2 optimized replacement priority rank for each of the failing components by assigning a whole number value based on a comparison of the overall CO2 optimized replacement priority ranking measure for each of the failing components with respect to one another. More specifically, in an embodiment in which there are three failing components, including a computer hard drive having an overall CO2 optimized replacement priority ranking measure of 5.568, a fan having an overall CO2 optimized replacement priority ranking measure of 13.12, and a router having an overall CO2 optimized replacement priority ranking measure of 9.34, the sustainability engine may assign the computer hard drive a CO2 optimized replacement priority rank of 3, the fan a CO2 optimized replacement priority rank of 1, and the router a CO2 optimized replacement priority rank of 2. In another example embodiment in which there are three failing components, including a computer hard drive having an overall CO2 optimized redistribution priority ranking measure of 15.48, a fan having an overall CO2 optimized redistribution priority ranking measure of 80.24, and a router having an overall CO2 optimized redistribution priority ranking measure of 12.6, the sustainability engine may assign the computer hard drive a CO2 optimized redistribution priority rank of 2, the fan a CO2 optimized redistribution priority rank of 1, and the router a CO2 optimized redistribution priority rank of 3. It is contemplated that any number of identified failing components may assessed according to the embodiments of FIG. 6 herein.

The sustainability engine may determine at block 616 in an embodiment whether the determined CO2 optimized replacement priority rank or the CO2 optimized redistribution priority rank is higher for each of the plurality of failing components. A CO2 optimized redistribution priority rank higher than a CO2 optimized replacement priority rank in an embodiment may indicate that redistribution of the workload of the failing component may be preferable to replacement based on user-centric considerations and CO2 footprint impact of both approaches. In such a scenario, the method may proceed to block 620 for recommendation of redistribution of the component's workload. More specifically, the CO2 optimized redistribution priority rank for the computer hard drive in an embodiment may be 2, while the CO2 optimized replacement priority rank for that same failing component is 3, indicating redistribution of the workload for the computer hard drive may be preferable to its replacement. If the CO2 optimized replacement priority rank for the component is higher than the CO2 optimized redistribution priority rank, the method may proceed to block 618 for consideration of replacement of the failing component.

At block 618, in an embodiment in which the $CO_2$ optimized replacement priority rank for one or more failing components is higher than the CO2 optimized redistribution priority rank, the sustainability engine may recommend replacement for a component with the highest replacement rank. For example, in an embodiment, both the fan and the router may have higher CO2 optimized replacement priority ranks than their respective CO2 optimized redistribution priority ranks. In such an embodiment, the sustainability engine may determine that the fan has a higher CO2 optimized replacement priority rank (e.g., 1) than the CO2 optimized replacement priority rank (e.g., 2) for the router. In such an embodiment, the sustainability engine may recommend replacement of the fan, and the method may proceed to block 620 for recommendations pertaining to the router.

In another embodiment, the sustainability engine may recommend an order of replacement for all of the failing components whose replacement rank is higher than the redistribution rank. In such an example embodiment, the sustainability engine may recommend that the user replace the fan, then the router. In such a way, the sustainability engine may allow the user to replace a plurality of failing components, in the order recommended, within budgetary constraints of the user.

In an embodiment in which one or more failing components are not considered candidates for replacement, the sustainability engine at block 620 may recommend redistribution of the workload for the failing component among identified available alternative components. For example, a failing component may not be considered a candidate for replacement in an embodiment in which CO2 balancing time value determined at block 604 for a component indicates replacing the component of interest may cause an overall increase in CO2 emissions, rather than a decrease. As another example, a failing component may not be considered a candidate for replacement if redistribution of the workload for the component may be preferable to replacement based on user-centric considerations and CO2 footprint impact of both approaches as determined at block 616. In either of these scenarios, the sustainability engine in an embodiment may recommend redistribution of the workload for the failing component (e.g., computer hard drive or router) among identified available alternative components (e.g., plurality of other available computer hard drives or routers within an enterprise system). The method for recommending replacement or redistribution of workload for a failing component in an embodiment may then end.

The blocks of the flow diagrams of FIGS. 4, 5, and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of prioritizing replacement of hardware components across a plurality of client hardware information handling systems based on carbon dioxide (CO2) footprint comprising:

receiving identification of all failing hardware components from execution of code instructions of system internal health assessor software executing at the client hardware information handling systems;

executing machine readable code instructions of a unified endpoint management (UEM) platform, via a hardware processor at an enterprise management information handling system, to determine user-centric replacement priority ranking values for prioritizing replacement of failing hardware components with respect each other and user-centric redistribution priority ranking values for the failing hardware components identified for the client hardware information handling systems based on ranked priority requirements including measured cost values, implementation time values, change in operating efficiency values, or resource consumption values to identify redistribution of workload of each failing hardware component compared to replacement for failing hardware components;

executing computer readable code instructions of the UEM platform, via the hardware processor, to determine, for each failing hardware component that is handling a workload at a client information handling system managed by the enterprise management information handling system, a redistribution CO2 footprint value predicted to result from redistribution of the workload to alternate hardware components, and a replacement CO2 footprint value predicted to result from replacement of each of the plurality of failing hardware components at client information handling systems managed by the enterprise management system;

executing computer readable code instructions of the UEM platform, via the hardware processor, to generate, for each of the failing hardware components at a client information handling system managed by the enterprise management information handling system, a CO2 optimized redistribution priority ranking value weighting the user-centric redistribution priority ranking measure by the redistribution $CO_2$ footprint value, and a $CO_2$ optimized replacement priority ranking value weighting the user-centric replacement priority ranking value by the replacement $CO_2$ footprint value; and executing computer readable code instructions of the UEM platform, via the hardware processor, to identify a first failing hardware component having a higher $CO_2$ optimized redistribution priority ranking value than a $CO_2$ optimized replacement priority ranking value; and executing redistribution of the workload for that first failing hardware component to alternate hardware components identified by the enterprise management information handling system.

2. The method of claim 1 further comprising:
transmitting a recommendation, for display via a graphical user interface, that the workload has been redistributed for the first failing hardware component to the alternate hardware components.

3. The method of claim 1, wherein one of the requirements is estimated operating efficiency of each of the plurality of failing hardware components and of each of a plurality of the alternate hardware components following redistribution of workloads for each of the plurality of failing hardware components.

4. The method of claim 1, wherein one of the requirements is current downstream operating efficiency of downstream hardware components affected by the operating efficiency of each of the plurality of failing hardware components.

5. The method of claim 1 further comprising:
transmitting a recommendation, for display via a graphical user interface, that the first failing hardware component be replaced at the client information handling system.

6. The method of claim 1, wherein the requirements include an estimated time for replacement of each of the failing hardware components and an estimated time for redistribution of workloads for each of the failing hardware components across a plurality of alternate hardware components.

7. The method of claim 1, wherein one of the requirements is an estimated cost for redistribution of workloads for each of the failing hardware components across a plurality of alternate hardware components.

8. A method of prioritizing replacement of hardware components across a plurality of client hardware information handling systems based on carbon dioxide ($CO_2$) footprint comprising:

A hardware right to repair (R2R) prioritization system executing on a management information handling system comprising: a hardware processor to receive identification of all failing hardware components for the plurality of client information handling systems managed by the management information handling system;

the hardware processor executing computer readable code instructions of the hardware R2R prioritization system to determine user-centric redistribution priority ranking values based on ranked priority requirements including measured cost values, redistribution implementation time values, change in operating efficiency values for redistribution, or resource consumption values for redistribution of workload of each failing hardware component, and determine user-centric replacement priority ranking values for the failing hardware components based on ranked priority requirements including measured replacement cost values, replacement implementation time values, change in operating efficiency values for replacement, or resource consumption values for replacement;

the hardware processor executing computer readable code instructions of the hardware R2R prioritization system to determine, for each failing hardware component handling a workload at the client information handling systems managed by the management information handling system, a redistribution $CO_2$ footprint value due to redistribution of the workload to alternate hardware components based on $CO_2$ generation calculations for redistribution, and a replacement $CO_2$ footprint value resulting from replacement of each of the plurality of failing hardware components based on $CO_2$ generation calculations for replacement operations;

the hardware processor executing computer readable code instructions of the hardware R2R prioritization system to generate, for each of the failing hardware components at the client information handling systems managed by the management information handling system, a $CO_2$ optimized redistribution priority ranking value by weighting the user-centric redistribution priority ranking value by the redistribution $CO_2$ footprint value, and a $CO_2$ optimized replacement priority ranking value by weighting the user-centric replacement priority ranking measure by the replacement $CO_2$ footprint; and the hardware processor executing computer readable code instructions of the hardware R2R prioritization system to identify a first failing hardware component having a higher $CO_2$ optimized redistribution priority ranking value than a $CO_2$ optimized replacement priority ranking value and executing redistribution of the workload for that first failing hardware component to alternate hardware components identified by the enterprise management information handling system.

9. The information handling system of claim 8 further comprising:
the hardware processor executing computer readable code instructions of the hardware R2R prioritization system to identify a second failing hardware component of a client information handling system having a highest $CO_2$ optimized replacement priority ranking value, where the $CO_2$ optimized replacement priority ranking measure for the second failing hardware component is higher than for the first failing hardware component and generating a recommendation via a graphical user interface to recommend replacement of the second failing hardware component, and to identify the redistribution of the workload for the first failing hardware component to the alternate hardware components at client information handling systems managed by the management information handling system.

10. The information handling system of claim 8, wherein the requirements include current hardware resource consumption at each of the client information handling systems and an estimated redistributed hardware resource consumption at each of the client information handling systems after redistribution of workloads from each of the plurality of failing hardware components to a plurality of alternate hardware components within the plurality of client information handling systems.

11. The information handling system of claim 8, wherein one of the requirements is an estimated replacement hardware resource consumption at each of the client information handling systems after replacement of each of the plurality of failing hardware components.

12. The information handling system of claim 8 further comprising:
- a network interface device to receive a telemetry indicating a number of errors associated with the first failing hardware component within a preset period of time meeting or exceeding a maximum error threshold to identify the first failing hardware component is in failure.

13. The information handling system of claim 8 further comprising:
- a network interface device to receive a telemetry indicating a test benchmark score for the first failing hardware component falling below a preset minimum benchmark value to identify the first failing hardware component is in failure.

* * * * *